United States Patent
Arakawa et al.

(10) Patent No.: US 6,764,737 B2
(45) Date of Patent: Jul. 20, 2004

(54) METHOD OF PRODUCING INFORMATION RECORDING MEDIUM, PRODUCTION APPARATUS AND INFORMATION RECORDING MEDIUM

(75) Inventors: Nobuyuki Arakawa, Kanagawa (JP); Ken Minemura, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/282,866

(22) Filed: Oct. 29, 2002

(65) Prior Publication Data

US 2003/0091781 A1 May 15, 2003

(30) Foreign Application Priority Data

Oct. 30, 2001 (JP) ..................................... P2001-333328
Oct. 11, 2002 (JP) ..................................... P2002-299030

(51) Int. Cl.[7] .............................................. B32B 3/02
(52) U.S. Cl. ................ 428/64.1; 428/64.4; 430/270.11; 264/328.14; 425/547
(58) Field of Search ............................ 428/64.1, 64.4; 430/270.11; 264/328.1, 328.14; 425/547

(56) References Cited

U.S. PATENT DOCUMENTS

| | | | | |
|---|---|---|---|---|
| 5,326,240 A | * | 7/1994 | Kudo et al. ..................... 425/3 |
| 6,066,380 A | * | 5/2000 | Oyanagi et al. ............ 428/64.1 |
| 6,127,017 A | * | 10/2000 | Hirata et al. ................ 428/64.1 |
| 6,472,031 B1 | * | 10/2002 | Daecher et al. .............. 428/1.1 |
| 6,558,152 B2 | * | 5/2003 | Yasuda et al. ............... 425/552 |

* cited by examiner

Primary Examiner—Elizabeth Mulvaney
(74) Attorney, Agent, or Firm—Robert J. Depke; Holland & Knight LLP

(57) ABSTRACT

A method of producing an information recording medium having enhanced planarity with high productivity, comprising steps of processing a surface of a disk substrate by satin-like finishing, heating and pressing the disk substrate through compression using a stamper having relief shapes so as to transfer the relief shapes to at least one satin-like finished surface of the disk substrate, forming a recording layer on the relief shape surface of the disk substrate, and forming a coating layer on the recording layer, and a production apparatus for the information recording medium, and an information recording medium produced by the method of producing.

18 Claims, 26 Drawing Sheets

100a

METHOD OF PRODUCING INFORMATION RECORDING MEDIUM, PRODUCTION APPARATUS AND INFORMATION RECORDING MEDIUM

This application claims priority to Japanese Patent Application Number JP2001-333328 filed Oct. 30, 2001, which is incorporated herein by reference.

BACKGROUND OF THE INVENTION

1. Field of the Invention

The present invention relates to a method of producing an information recording medium, a production apparatus for the information recording medium, and an information recording medium produced by the production method.

2. Description of the Related Art

Recently, in the field of information recording, research on optical information recording systems is being conducted everywhere.

Optical information recording systems have numerous advantages such as the capability of non-contact recording and reproduction and the ability to handle various forms of memories such as read only types, write-once types, and rewritable types. Broad applications from industrial use to consumer use are being considered as systems enabling realization of inexpensive and large size files.

Increased capacity of optical recording media (hereinafter also referred to "optical disks") for the above various types of optical information recording systems has been achieved mainly by shortening the wavelength of the laser light serving as the light source used in optical information recording systems and adopting objective lenses having high numerical apertures to reduce the spot size on a focal plane.

For example, in a CD (compact disk), the thickness of the disk substrate forming a light transmitting layer is about 1.2 mm, the wavelength of the laser light is 780 nm, the numerical aperture (NA) of the objective lens is 0.45, and the capacity is 650 MB, while in a DVD-ROM (digital versatile disk read-only memory), the thickness of the disk substrate forming a light transmitting layer is about 0.6 mm, the wavelength of the laser light is 650 nm, the NA is 0.6, and the capacity is 4.7 GB. A DVD is for example obtained by bonding together two disk substrate of about 0.6 mm thickness to form a disk having a thickness of 1.2 mm.

Furthermore, in the next generation optical disk systems, it is possible to increase the capacity to 22 GB or more by using an optical disk comprising an optical recording layer over which is formed a protection layer, that is, a light transmitting coating layer, reduced in thickness to about 0.1 mm, and making the laser light wavelength 450 nm or less and the NA 0.78 or greater.

FIG. 1A is a schematic perspective view of an optical disk for the above next generation optical disk system.

An optical disk DC forms an approximately disk shape with a center hole CH formed at a center portion thereof and is driven to rotate in a drive direction DR.

When recording or reproducing information, light LT such as a laser light of a blue to blue-violet color region is focused on the optical recording film in the optical disk DC by an objective lens OL having a numerical aperture of for example 0.8 or greater.

FIG. 1B is a schematic sectional view of the above optical disk.

Grooves for dividing track regions are provided in one surface of a disk substrate 30 having a thickness of about 1.1 mm formed of polycarbonate resin etc. An optical recording layer 31 comprised of for example a reflection film, a dielectric film, a recording film, another dielectric film, etc. stacked in that order is formed on this surface. The layer configuration and the number of layers of the optical recording layer 31 differ according to the type of recording material and the design.

The above recording film is for example a phase change type recording film, a magneto-optical recording film, or a recording film containing an organic dye.

Further, a light transmitting protection layer (coating layer) 32 having a film thickness of 0.1 mm comprised of for example an adhesive layer and a polymer film is formed on the optical recording layer 31.

When recording on or reproducing from the above optical disk, light LT such as laser light is focused by the objective lens OL to the optical recording layer 31 from the protection layer 32 side.

At the time of reproduction from the optical disk, returned light reflected at the optical recording layer 31 is received by a light-receiving element, a predetermined signal is generated by a signal processing circuit, and a reproduction signal is extracted.

A production method of the above optical disk shown in FIGS. 1A and 1B will be explained next.

First, for example, a disk substrate 30 comprised of for example polycarbonate resin is formed by injection molding using injection mold described below having a stamper for disk substrate which has a relief pattern for optical recording layer.

Next, an optical recording layer 31 is formed on the disk substrate.

Next, polycarbonate film is bonded to the optical recording layer 31 by adhesive layer to form the light transmitting protection layer (coating layer) 32 of 0.1 mm thickness.

The optical disk shown in FIGS. 1A and 1B can thus be formed.

FIG. 2 is a schematic view of the configuration of an injection molding mold for forming a disk substrate according to a conventional method.

An outer circumferential ring 61, a fixed side mirror 62, a fixed side temperature adjusting circuit 63, a stamper 64, and a sprue 65 are provided as fixed side mold parts at a fixed side attachment plate FT. On the other hand, a movable side mirror 67, a center pin 68, and a gate cut punch 69 are provided as movable side mold parts in movable side attachment plate MT. Resin is injected into a cavity 66 composed of the above parts to form a disk substrate.

However, in information recording medium including CDs, DVDs, and other optical disks, including next generation optical disks of the above configuration, and further hard disks, the disk substrates are generally formed by injection molding. In this case, however, a mold for the injection molding is configured by a plurality of parts. Clearance is inevitable between the parts. Therefore, burrs occur in the disk substrate formed.

Further, it is difficult to achieve a uniform surface precision of the parts or stamper. If step differences occur between the parts, the steps will also end up being transferred to the disk substrate formed.

Further, as shown in FIG. 3A, a bulge RD easily occurs at the outer circumferential ends of a disk substrate 30 formed by injection molding. In this case, the optical recording layer 31 is formed along the surface of the bulge RD.

If for example the protection layer film is bonded at the upper layer thereof by an adhesive layer to form the protection layer 32, as shown in FIG. 3B, an air bubble layer AL ends up occurring between the protection layer 32 and the optical recording layer 31, so use of the outer circumferential region RG becomes difficult.

Even when coating ultraviolet curing resin or other protection layer on the optical recording layer by spin coating, etc., the bulge of the outer circumferential end region is further accentuated and therefore it becomes impossible to use this region.

By adjusting the pressure for injecting the molten resin so as to suppress the occurrence of the bulge in the injection molding of the disk substrate, a recess where part of the substrate becomes thinner easily occurs and hence a new problem arises.

Disk substrates for optical disks were produced by the above injection molding and were examined for planarity.

Here, the disk substrates formed had the shape shown in FIGS. 4A to 4C, where FIG. 4A is a plan view of a signal surface, FIG. 4B is a side view thereof, and FIG. 4C is a plan view of a read surface.

In the figure, the positions of an innermost diameter (A), a sprue bushing (B), an air groove (C), a stamper holder (D), a signal portion (stamper) (E), an ejector (F), an ejector sleeve guide (G), a stacking rib (H), a mirror (I), and an outer circumferential end (Z) are shown.

FIG. 5A is a view showing the measurement results of the planarity in the vicinity of an outer circumferential end of a signal surface of the disk substrate according to the conventional method. The abscissa denotes a position on the disk X(mm), and the ordinate denotes a height of the surface Y($\mu$m).

This shows the occurrence of a bulge RD at the vicinity of the outer circumferential end Z.

FIG. 5B is a view showing the measurement results of the planarity in the vicinity of an outer circumferential end of a read surface of the disk substrate according to the conventional method. The abscissa denotes a position on the disk X(mm), while the ordinate denotes a height of the surface Y($\mu$m).

This shows the occurrence of a burr BR and bulge RD at the vicinity of the outer circumferential end Z.

FIG. 6A is a view showing the measurement results of the planarity in the vicinity of the outer circumferential end of a signal surface of a disk substrate formed by adjusting the pressure for injecting molten resin in the conventional method. The abscissa denotes a position on the disk X(mm), while the ordinate denotes a height of the surface Y($\mu$m).

The bulge RD in the vicinity of the outer circumferential end Z is suppressed, however, a recess RS where the disk becomes thinner occurs.

FIG. 6B is a view showing the measurement results of the planarity in the vicinity of an outer circumferential end of a read surface of a disk substrate formed while adjusting the pressure for injecting molten resin in the conventional method. The abscissa denotes a position on the disk X(mm), while the ordinate denotes a height of the surface Y($\mu$m).

The bulge RD in the vicinity of the outer circumferential end Z is suppressed, however, a recess RS where the disk becomes thinner occurs.

FIGS. 7A and 7B are views showing the measurement results of the planarity in the vicinity of the innermost diameter A of the signal surface of the disk substrate according to the conventional method divided into two sections. The abscissa denotes a position on the disk X(mm), while the ordinate denotes a height of the surface Y($\mu$m).

Occurrence of a burr (BR) and step difference (ST) was seen at an interface of the stamper holder (D) and the signal portion (stamper) (E). Further, a burr (BR) occurred at the innermost diameter A end or the like.

FIGS. 8A and 8B are views showing the measurement results of the planarity in the vicinity of the innermost diameter A of the read surface of the disk substrate according to the conventional method divided into two sections. The abscissa denotes a position on the disk X(mm), while the ordinate denotes a height of the surface Y($\mu$m).

At an interface of the ejector sleeve guide (G) and the mirror (I), occurrence of a slight burr (BR) and step difference (ST) was seen. Further, a step difference (ST) occurred at an interface of the ejector (F) and the ejector sleeve guide (G).

The method of forming a disk substrate by a compression molding is known. However, there is a problem that it needs long process time because resin is heated and made molten by mold and cooled after compression molding in the compression molding method.

Further, it is difficult to remove gas from resin in the time of compression molding, and vacuum exhaust is performed but it is not sufficient, therefore there is a problem that shape of the disk substrate becomes bad due to retaining air bubble in the resin.

Further, in a hard disk, bulge is formed when the injection molding is performed as well as the disk substrate of the optical disk, therefore the magnetic head floating with a clearance of several tens of nm ends up striking the surface of the hard disk due to this bulge.

SUMMARY OF THE INVENTION

An object of the present invention is to provide a method of a method of producing an information recording medium enabling production of disk substrate, etc. at a high productivity and enhanced planarity in an optical disk or other information recording medium, and to provide a production apparatus for producing the same and a information recording medium produced by such a method of producing.

To achieve the above object, the method of producing an information recording medium of the present invention comprises steps of: processing a surface of a disk substrate by satin-like finishing, heating and pressing the disk substrate through compression using a stamper having relief shapes so as to transfer the relief shapes to at least one satin-like finished surface of the disk substrate, forming a recording layer on the relief shape surface of the disk substrate, and forming a coating layer on the recording layer.

In the above method of producing an information recording medium, a surface of a disk substrate is processed by satin-like finishing in advance, then the disk substrate is heated and pressed through compression using a stamper having relief shapes so as to transfer the relief shapes to at least one satin-like finished surface of the disk substrate. Next, a recording layer is formed on the relief shape surface of the disk substrate, and a coating layer is formed on the recording layer.

Further, to achieve the above object, the method of producing an information recording medium of the present invention comprises steps of: processing a surface of a disk substrate by satin-like finishing, heating and pressing the disk substrate through compression using a stamper having relief shapes so as to transfer the relief shapes to at least one satin-like finished surface of the disk substrate, forming a first optical recording layer on the relief shape surface of the disk substrate, processing a surface of a resin sheet by satin-like finishing, heating and pressing the resin sheet through compression using a stamper having relief shapes so as to transfer the relief shapes to at least one satin-like finished surface of the resin sheet, forming a second optical recording layer on the relief shape surface of the resin sheet, bonding the first optical recording layer and the second optical recording layer.

In the above method of producing an information recording medium, a surface of a disk substrate is processed by satin-like finishing in advance, then the disk substrate is heated and pressed through compression using a stamper having relief shapes so as to transfer the relief shapes to at least one satin-like finished surface of the disk substrate. Next, a first optical recording layer is formed on the relief shape surface of the disk substrate. On the other hand, a surface of a resin sheet is processed by satin-like finishing in advance, then the resin sheet is heated and pressed through compression using a stamper having relief shapes so as to transfer the relief shapes to at least one satin-like finished surface of the resin sheet. Next, a second optical recording layer is formed on the relief shape surface of the resin sheet. Next, the first optical recording layer and the second optical recording layer are bonded.

Further, to achieve the above object, the production apparatus for an information recording medium of the present invention is a production apparatus for forming a substrate having relief shapes on at least one surface thereof of an information recording medium comprising the substrate and a recording layer formed on the relief shape surface of the substrate, the production apparatus of an information recording medium comprising: a mold for a compression molding having on an inside surface of a cavity thereof a stamper having relief shapes corresponding to the relief shapes, a heating means for heating the mold, and a pressing means for pressing the mold, the mold being split into an upper, center, and lower parts and being attached to a press movable vertically by the pressing means, a means for correcting parallelism of the lower mold and the upper mold of the press at the time of pressing of the press and making a pressing force uniform between the lower mold and upper mold being provided.

In the above production apparatus of an information recording medium of the present invention, the mold for a compression molding having on an inside surface of a cavity thereof a stamper having relief shapes corresponding to the relief shapes, is split into an upper, center, and lower parts and is attached to a press movable vertically by the pressing means, and a means for correcting parallelism of the lower mold and the upper mold of the press at the time of pressing of the press and making a pressing force uniform between the lower mold and upper mold is provided.

Further, to achieve the above object, the information recording medium of the present invention comprises a disk substrate having relief shapes on at least one surface thereof, a recording layer formed on the relief shape surface of the disk substrate, and a coating layer formed on the recording layer, the disk substrate being a disk substrate processed by a satin-like finishing of the surface thereof, then transferred with the relief shapes to the satin-like finished surface thereof by heating and pressing through compression molding using a stamper having relief shapes.

In the above information recording medium of the present invention, a recording layer and a coating layer are formed on the relief shape surface of the disk substrate which is processed by a satin-like finishing of the surface thereof, then transferred with the relief shapes to the satin-like finished surface thereof by heating and pressing through compression molding using a stamper having relief shapes.

Further, to achieve the above object, the information recording medium of the present invention comprises a disk substrate having relief shapes on at least one surface thereof, a first optical recording layer formed on the relief shape surface of the disk substrate, a resin sheet having relief shapes on at least one surface thereof, a second optical recording layer formed on the relief shape surface of the disk substrate, the first optical recording layer and the second optical recording layer being bonded, and light being focused from the resin sheet side for the disk substrate to the first optical recording layer and the second optical recording layer to record or reproduce information, wherein the disk substrate being a disk substrate processed by a satin-like finishing of the surface thereof, then transferred with the relief shapes to the satin-like finished surface thereof by heating and pressing through compression molding using a stamper having relief shapes, the resin sheet being a resin sheet processed by a satin-like finishing of the surface thereof, then transferred with the relief shapes to the satin-like finished surface thereof by heating and pressing through compression molding using a stamper having relief shapes.

In the above information recording medium of the present invention, a first optical recording layer is formed on the relief shape surface of the disk substrate which is processed by a satin-like finishing of the surface thereof, then transferred with the relief shapes to the satin-like finished surface thereof by heating and pressing through compression molding using a stamper having relief shapes, on the other hand, a second optical recording layer is formed on the relief shape surface of the resin sheet which is processed by a satin-like finishing of the surface thereof, then transferred with the relief shapes to the satin-like finished surface thereof by heating and pressing through compression molding using a stamper having relief shapes, and the first optical recording layer and the second optical recording layer is bonded.

BRIEF DESCRIPTION OF THE DRAWINGS

The above and other objects and features of the present invention will be apparent more in detail with reference to the accompanying drawings, in which.

DESCRIPTION OF THE PREFERRED EMBODIMENTS

Below, a detailed explanation will be given of embodiments of the present invention by using the drawings.

First Embodiment

Figure 9A:
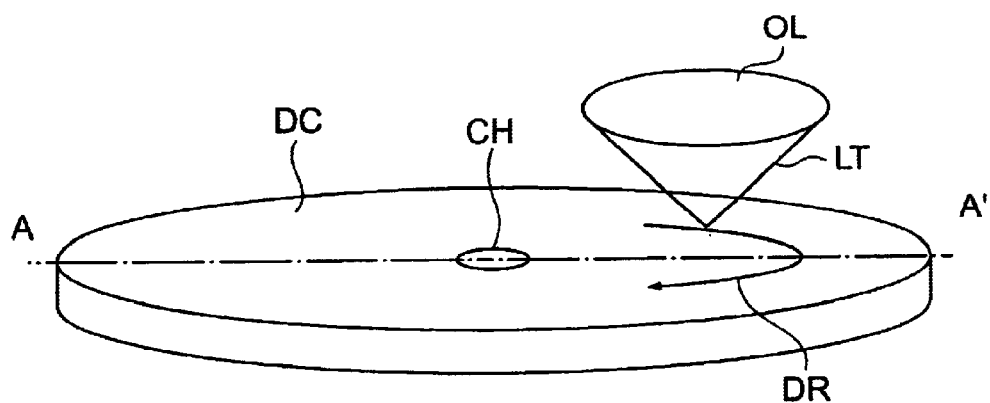
FIG. 9A is a schematic perspective view of an optical disk according to a first embodiment.

FIG. 9A is a schematic perspective view of an optical disk according to the present embodiment.

An optical disk DC forms an approximately disk shape with a center hole CH formed at a center portion thereof and is driven to rotate in a drive direction DR.

When recording or reproducing information, light LT such as a laser light of a blue to blue-violet color region is focused on an optical recording film in the optical disk DC by an objective lens OL having a numerical aperture of for example 0.8 or greater.

Figure 9B:
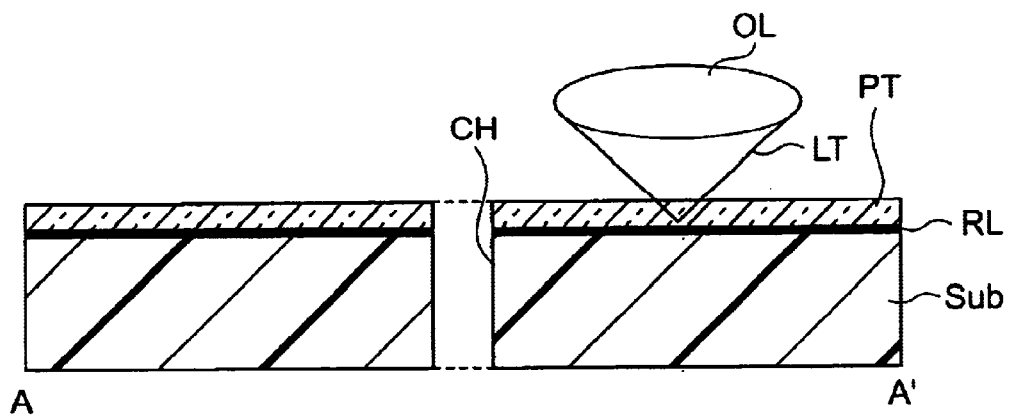
FIG. 9B is a schematic sectional view of the above optical disk.

FIG. 9B is a schematic sectional view of the above optical disk.

An optical recording layer RL is formed on one surface of a disk substrate Sub having a thickness of about 1.1 mm comprised of polycarbonate resin etc. Further, a light transmitting protection layer (coating layer) PT having a film thickness of about 0.1 mm is formed at the upper layer of the optical recording layer RL.

When recording on or reproducing from the above optical disk, light LT such as laser light is focused by an objective lens to the optical recording layer RL from the light transmitting protection layer PT side.

At the time of reproduction from the optical disk, the returned light reflected at the optical recording layer RL is received at a light-receiving element, a predetermined signal is generated by a signal processing circuit, and a reproduction signal is extracted.

Figure 10:
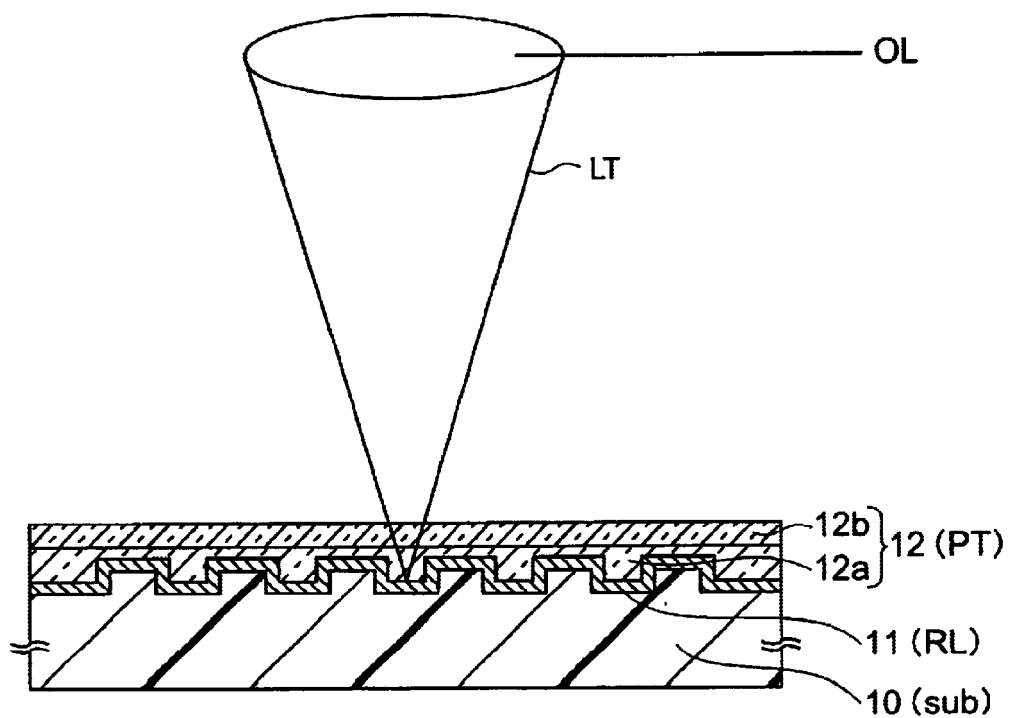
FIG. 10 is a sectional view of the key portions of the optical disk shown in FIG. 9.

FIG. 10 is a sectional view of the key portions of an optical disk shown in FIGS. 9A and 9B.

Relief shapes for dividing track regions are provided in one surface of a disk substrate 10 (Sub) formed of polycarbonate resin etc. An optical recording layer 11 (RL) is formed on this surface. A light transmitting protection layer (coating layer) 12 (PT) comprised of for example an adhesive layer 12a and a polycarbonate-resin sheet 12b is formed on the optical recording layer 11.

The method of producing the above optical disk will be explained below.

Figure 11A:
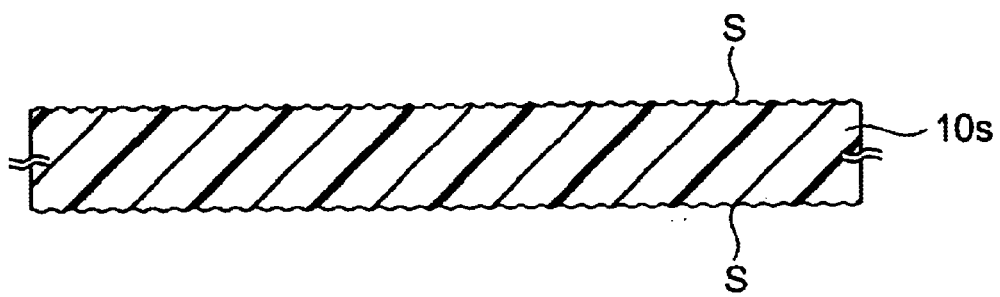
FIGS. 11A to 11C are sectional views showing a production step of the method of producing an optical disk according to the first embodiment of the present invention.

First, as shown in FIG. 11A, a surface of the disk substrate 10s formed of polycarbonate resin etc. is processed to satin-like finished surface S. The process for satin-like finished surface can be performed using later explained apparatuses. The maximum surface roughness Rmax of the satin-like finished surface is less than 50 μm.

Figure 11B:
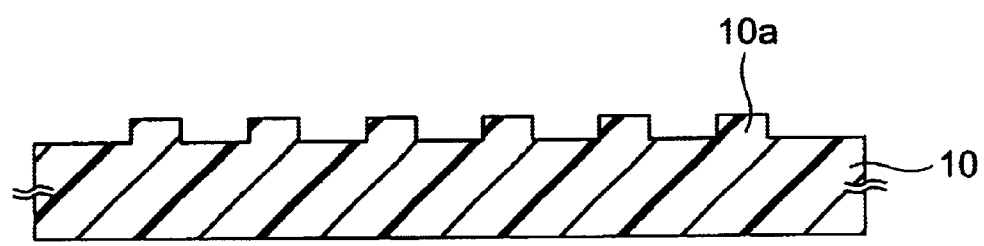

Next, as shown in FIG. 11B, the disk substrate is heated and pressed through compression molding using a stamper (not illustrated) having relief shapes so as to transfer the relief shapes to one satin-like finished surface of the disk substrate 10s. The compression molding process can be performed using later explained apparatuses.

As a result, a disk substrate 10 formed with relief shapes containing projecting portions 10a in one surface thereof is obtained. In the both surfaces of the disk substrate 10, satin-like finished shapes have not been left, but the surfaces become mirror surfaces expect for having relief shapes.

Figure 11C:
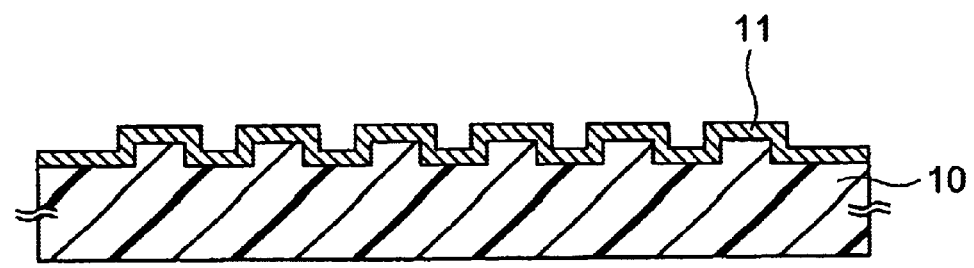

Next, as shown in FIG. 11C, optical recording layer 11 is formed on the relief shapes surface of the disk substrate 10. The optical recording layer 11 is for example stacked films of a dielectric film, a recording film, another dielectric film, and a reflection film. For example, phase change recording materials or magneto-optical recording materials can be used as the recording firm.

Next, polycarbonate resin sheet 12b is bonded to the optical recording layer 11 by adhesive layer 12a formed of ultraviolet curing resin etc. and the adhesive layer 12a is cured by irradiation of ultraviolet ray to form the light transmitting protection layer (coating layer) 12. The optical disk shown in FIG. 10 can thus be produced.

According to the method of producing an optical disk according to the present embodiment described above, a disk substrate for forming an optical disk can be obtained by processing a disk substrate by satin-like finishing of the surface thereof, then heating and pressing it by compression molding using stampers having relief shapes to transfer the relief shapes to the processed surface by satin-like finishing, whereby it is possible to produce with higher productivity a disk substrate having enhanced planarity without burrs or step differences or bulges at the disk outer circumferential portion as in a conventional injection molded substrate. Further, because compression molding is performed after processing the surface of the disk substrate by satin-like finishing, the way of escape of air can be kept in the compression molding, so that air bubble does not retain in the resin and good molding can be performed.

Further, in the compression molding process where the relief shapes are transferred to the above disk substrate, the disk substrate can be processed sufficiently when the only outermost layer of the disk substrate is heated and pressed, therefore cooling time for the processed object and the mold is short and production efficiency can be raised.

Second Embodiment

The optical disk according to the present embodiment differs from the optical disk according to the first embodiment in that a plurality of optical recording layers are stacked.

Figure 12:
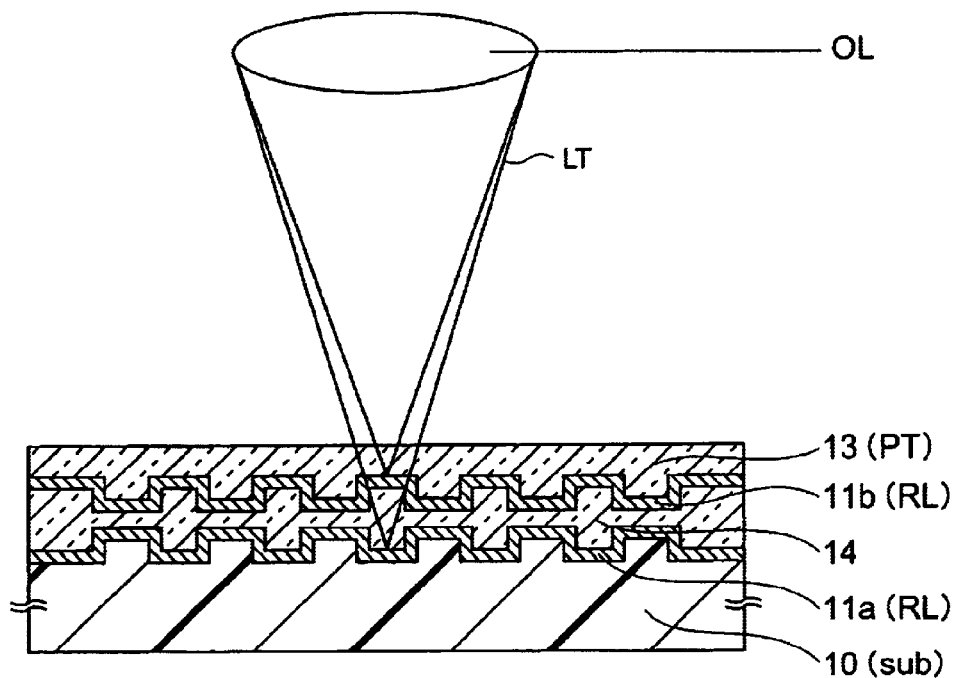
FIG. 12 is a sectional view of the key portions of the optical disk according to the second embodiment of the present invention.

FIG. 12 is a schematic sectional view of the optical disk according to the present embodiment wherein two optical recording layers are stacked.

Relief shapes for dividing track regions are provided in one surface of a disk substrate 10 (Sub) having a thickness of about 1.1 mm formed of polycarbonate resin etc. The first optical recording layer 11a is formed on this surface.

On the other hand, relief shapes for dividing track regions are provided in one surface of a resin sheet 13 having a thickness of about 0.1 mm and being light transmitting protection layer. The second optical recording layer 11b is formed on this surface.

The first optical recording layer 11a and the second optical recording layer 11b are bonded by adhesive layer 14.

Figure 13:
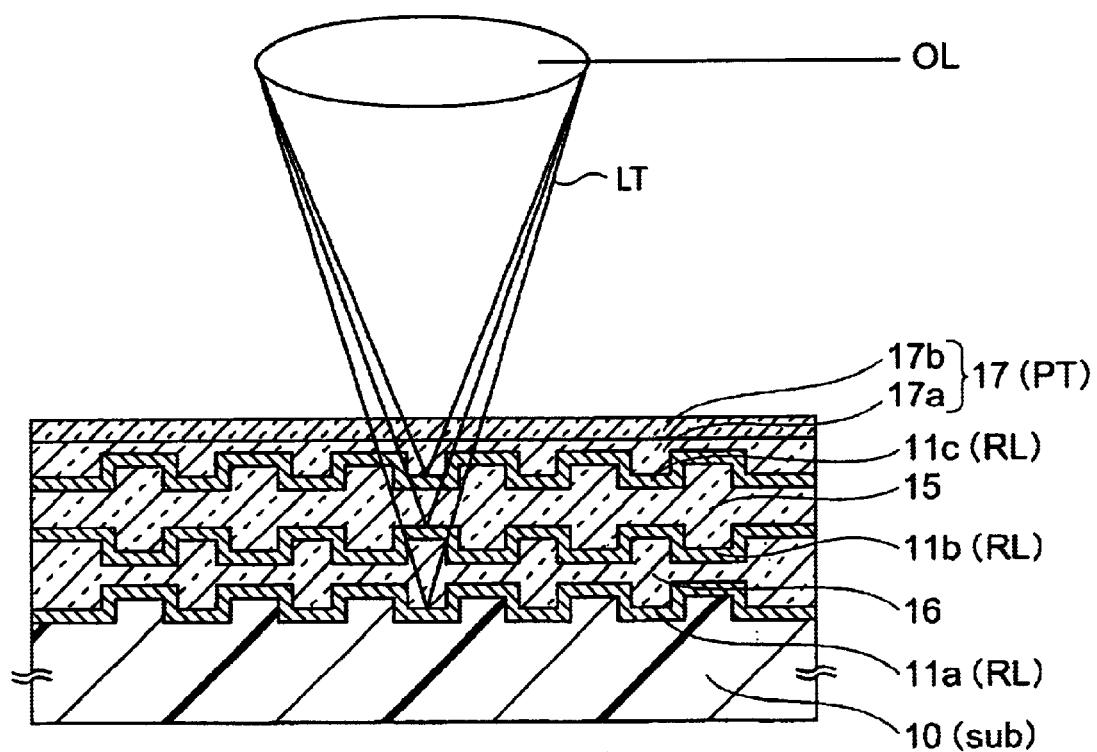
FIG. 13 is a sectional view of the key portions of the optical disk according to the second embodiment of the present invention.

Further, as shown in FIG. 13, an application to an optical disk having a structure wherein three optical recording layers are stacked is also possible.

The optical disk of this structure differs from the optical disk shown in FIG. 12 in that the second optical recording layer 11b and the third optical recording layer 11c are formed on the both sides of the disk substrate respectively, and a light transmitting protection layer (coating layer) 17 (PT) comprised of for example a bonding layer 17a and a polycarbonate resin sheet 17b is formed on the third optical recording layer 11c.

The method of producing the optical disk shown in FIG. 12 will be explained below.

First, according to the production method similar to the first embodiment, a surface of the disk substrate 10 is processed to satin-like finished surface S, then the disk substrate 10 is heated and pressed through compression molding using a stamper having relief shapes so as to transfer the relief shapes to one satin-like finished surface of the disk substrate 10, and the first optical recording layer 11a is formed on this surface.

Figure 14A:
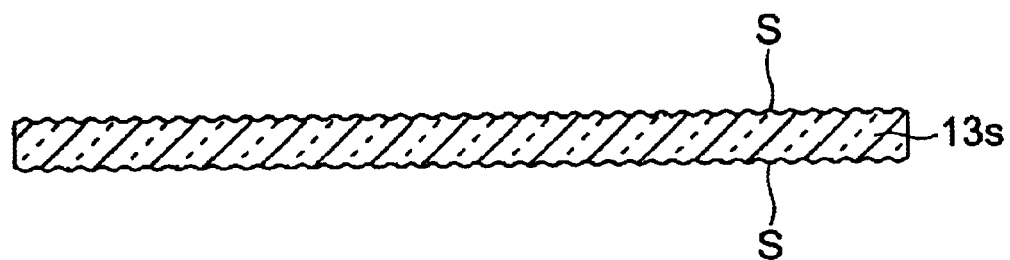
FIGS. 14A to 14C are sectional views showing a production step of the method of producing an optical disk according to the second embodiment of the present invention.

On the other hand, as shown in FIG. 14A, a surface of the resin sheet 13s formed of polycarbonate resin etc. is processed to satin-like finished surface S. The process for satin-like finished surface can be performed using later explained apparatuses. In the case of the resin sheet, the surface roughness of the satin-like finished surface is made similar to the disk substrate of the first embodiment.

Figure 14B:
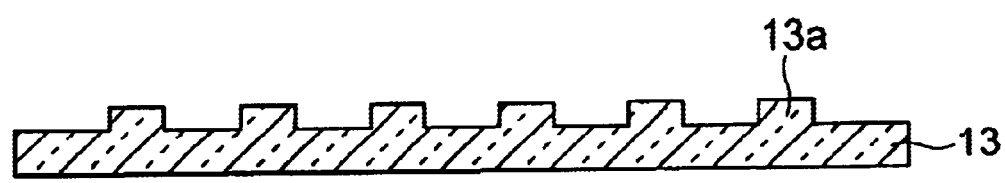

Next, as shown in FIG. 14B, the resin sheet is heated and pressed through compression molding using a stamper (not illustrated) having relief shapes so as to transfer the relief shapes to one satin-like finished surface of the resin sheet 13s. The compression molding process can be performed using later explained apparatuses.

As a result, a resin sheet 13 formed with relief shapes containing projecting portions 13a in one surface thereof is obtained. In the both surfaces of the resin sheet 13, satin-like finished shapes have not been left, but the surfaces become mirror surfaces expect for having relief shapes.

Figure 14C:
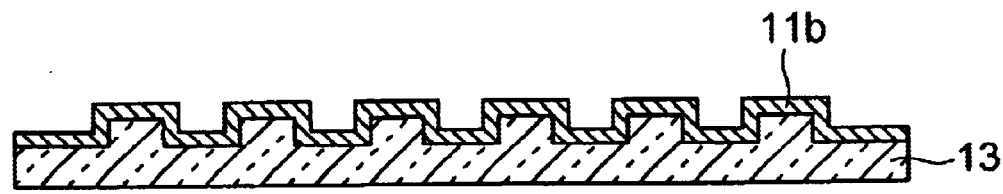

Next, as shown in FIG. 14C, the second optical recording layer 11b is formed on the relief shapes surface of the resin sheet 13.

Next, the first optical recording layer 11a and the second optical recording layer 11b are bonded by an adhesive layer 14 formed of ultraviolet curing resin etc. and the adhesive layer 14 is cured by an irradiation of ultraviolet ray.

The optical disk shown in FIG. 12 can thus be produced.

The method of producing the optical disk shown in FIG. 13 will be explained below.

First, according to the production method similar to the first embodiment, a surface of the disk substrate 10 is processed to satin-like finished surface S, then the disk substrate 10 is heated and pressed through compression molding using a stamper having relief shapes so as to transfer the relief shapes to one satin-like finished surface of the disk substrate 10, and the first optical recording layer 11a is formed on this surface.

Figure 15A:
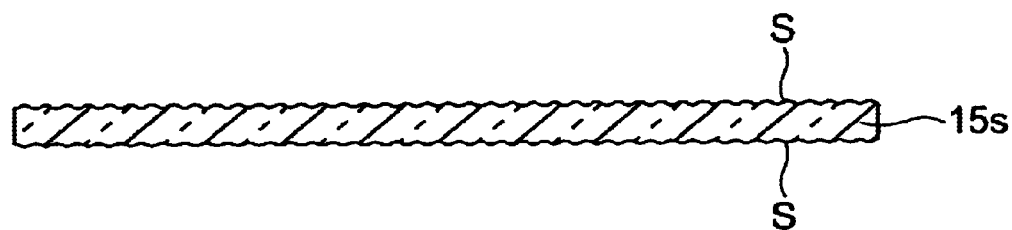
FIGS. 15A to 15E are sectional views showing a production step of the method of producing an optical disk according to the second embodiment of the present invention.

On the other hand, as shown in FIG. 15A, a surface of the resin sheet 15s formed of polycarbonate resin etc. is processed to satin-like finished surface S. The process for satin-like finished surface can be performed using later explained apparatuses.

Figure 15B:
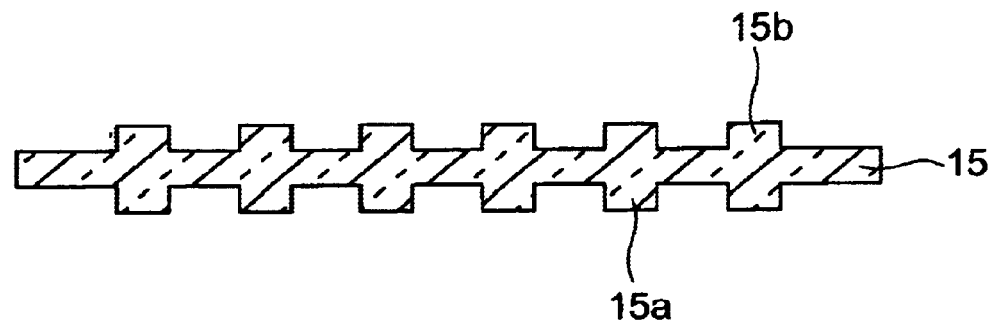

Next, as shown in FIG. 15B, the resin sheet is heated and pressed through compression molding using a stamper (not illustrated) having relief shapes so as to transfer the relief shapes to both satin-like finished surfaces of the resin sheet 15s. The compression molding process can be performed using later explained apparatuses.

As a result, a resin sheet 15 formed with relief shapes containing projecting portions 15a in one surface thereof and relief shapes containing projecting portions 15b in other surface thereof is obtained. In the both surfaces of the resin sheet 15, satin-like finished shapes have not been left, but the surfaces become mirror surfaces expect for having relief shapes.

Figure 15C:
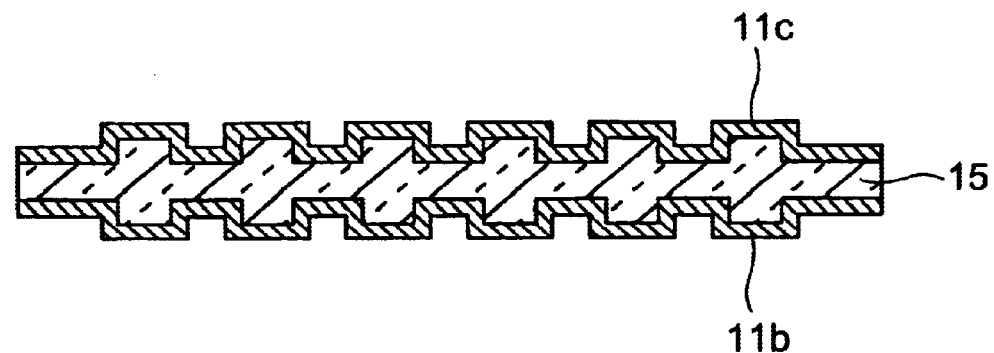

Next, as shown in FIG. 15C, the second optical recording layer 11b is formed on the relief shapes surface of one surface of the resin sheet 15, and the third optical recording layer 11c is formed on the relief shapes surface of the other surface of the resin sheet 15.

Figure 15D:
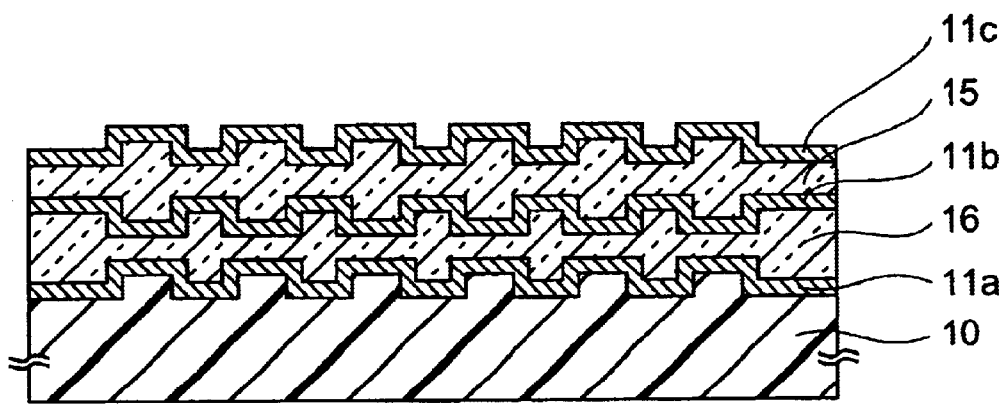

Next, as shown in FIG. 15D, the first optical recording layer 11a and the second optical recording layer 11b are bonded by an adhesive layer 16 formed of ultraviolet curing resin etc. and the adhesive layer 16 is cured by an irradiation of ultraviolet ray.

Figure 15E:
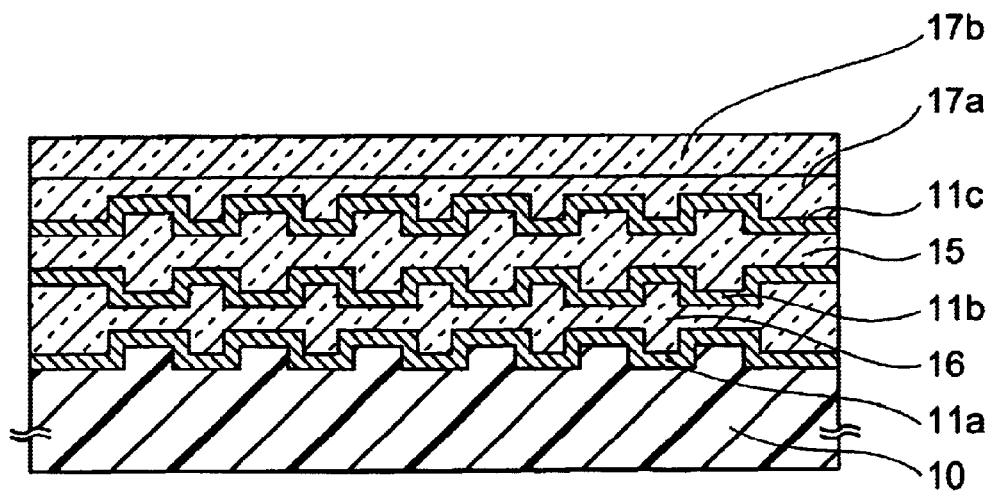

Next, as shown in FIG. 15E, polycarbonate resin sheet 17b is bonded to the third optical recording layer 11c by adhesive layer 17a formed of ultraviolet curing resin etc. and the adhesive layer 17a is cured by irradiation of ultraviolet ray to form the light transmitting protection layer (coating layer) 17. The optical disk shown in FIG. 13 can thus be produced.

According to the method of producing an optical disk according to the present embodiment described above, a disk substrate and a resin sheet for forming an optical disk can be obtained by processing a disk substrate and a resin sheet by satin-like finishing of the surface thereof, then heating and pressing them by compression molding using stampers having relief shapes to transfer the relief shapes to the processed surface by satin-like finishing, whereby it is possible to produce with higher productivity a disk substrate having enhanced planarity without burrs or step differences or bulges at the disk outer circumferential portion as in a conventional injection molded substrate. Further, because compression molding is performed after processing the surface of the disk substrate by satin-like finishing, the way of escape of air can be kept in the compression molding, so that air bubble does not retain in the resin and good molding can be performed.

Further, in the compression molding process where the relief shapes are transferred to the above disk substrate and the resin sheet, the disk substrate and the resin sheet can be processed sufficiently when the only outermost layer of the disk substrate and the resin sheet are heated and pressed, therefore cooling time for the processed objects and the mold is short and production efficiency can be raised.

In the process having a plurality of optical recording layers described above, optical recording layers except for the lowermost optical recording layer need to be made translucent.

For example, in the structure having three optical recording layers, with respect to a reflectance of the first optical recording layer 11a forming lowermost layer of more than 80% (for example 90%), the reflectance of the second optical recording layer 11b is set to about 30% and the reflectance of the third optical recording layer 11c is set to about 19%.

Accordingly, data can be accurately recorded on and reproduced from each of the optical recording layers without disturbing the recording or reproduction of data on or from the lower optical recording layer.

These reflectances may be adjusted by sequentially reducing the thickness of the reflection films, comprised of aluminum or silver and alloys thereof, forming the translucent films in the optical recording layers toward the uppermost layer.

Third Embodiment

An information recording medium according to the present embodiment is a discrete type hard disk obtained by sheet molding. The compression molding method shown in the first embodiment is applied to a disk substrate of the hard disk.

Figure 16:
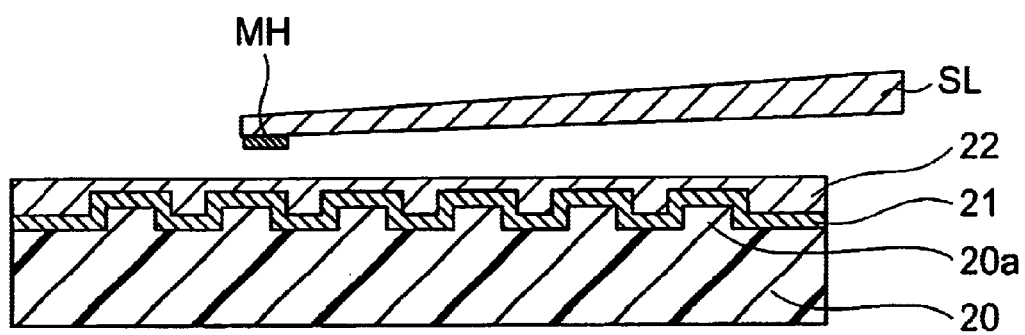
FIG. 16 is a schematic sectional view of a hard disk according a third embodiment of the present invention.

FIG. 16 is a schematic sectional view of a one-sided structure hard disk apparatus according to the present embodiment.

Relief shapes 20a for imparting a servo signal are formed on one surface of a disk substrate 20, a magnetic film 21 is formed over the entire surface thereof, and a silicone oil or other lubricant layer 22 is formed thereon as a coating layer.

In the above hard disk, signals are recorded on or reproduced from the magnetic films 21 by a floating magnetic head MH at the tip of a slider SL.

Figure 17:
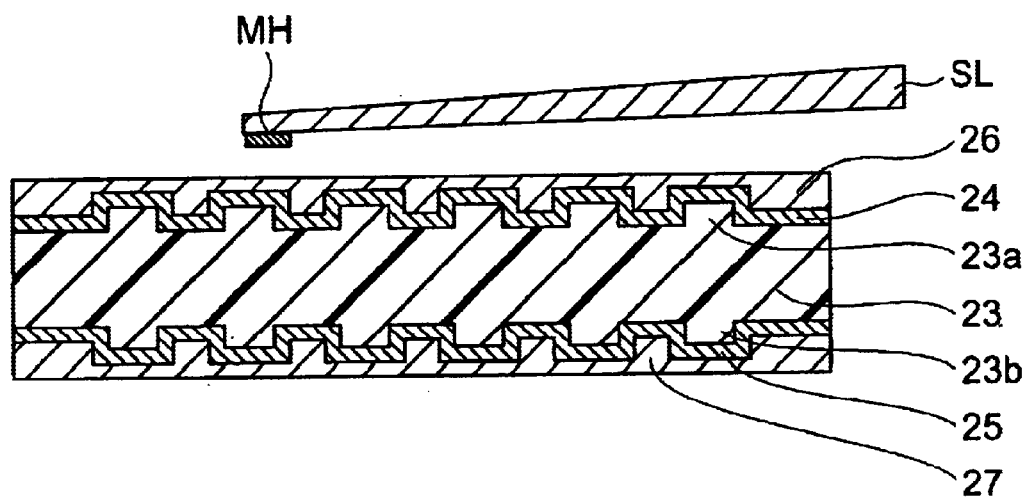
FIG. 17 is a schematic sectional view of a hard disk according a third embodiment of the present invention.

FIG. 17 is a schematic sectional view of a two-sided structure hard disk apparatus according to the present embodiment.

Relief shapes 23a for imparting a servo signal are formed on a top surface of a disk substrate 23, the first magnetic film 24 is formed over the entire surface thereof, and a silicone oil or other lubricant layer 26 is formed thereon as a coating layer.

At the same time, relief shapes 23b for imparting a servo signal are formed on a bottom surface of the disk substrate 23, the second magnetic film 25 is formed over the entire surface thereof, and a silicone oil or other lubricant layer 27 is formed thereon as a coating layer.

In the above hard disk, signals are recorded on or reproduced from the first and second magnetic films (24, 25) by a floating magnetic head MH at the tip of a slider SL.

A method of producing the above hard disk shown in FIG. 16 will be explained next.

Figure 18A:
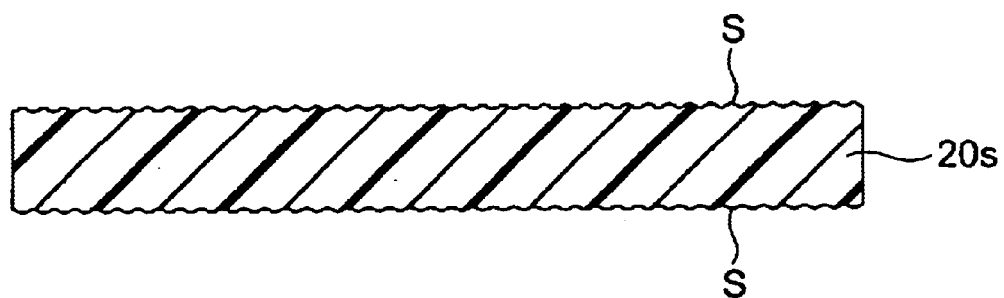
FIGS. 18A to 18C are sectional views showing a production step of a method of producing a hard disk according to the third embodiment of the present invention.

First, as shown in FIG. 18A, a surface of the disk substrate 20s formed of an amorphous polyolefin resin etc. slightly thicker than the desired thickness of 0.2 mm to 1.2 mm is processed to satin-like finished surface S. The process for satin-like finished surface can be performed using later explained apparatuses. Here, the surface roughness of the satin-like finished surface is made similar to the disk substrate of the first embodiment.

Figure 18B:
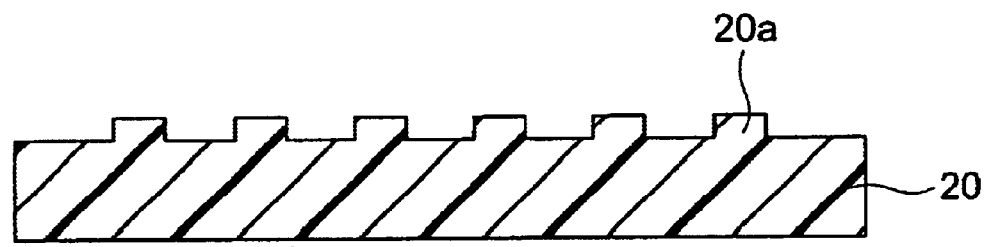

Next, as shown in FIG. 18B, the disk substrate is heated and pressed through compression molding using a stamper (not illustrated) having relief shapes so as to transfer the relief shapes to one satin-like finished surface of the disk substrate 20s. The compression molding process can be performed using later explained apparatuses.

As a result, a disk substrate 20 formed with relief shapes containing projecting portions 20a in one surface thereof is obtained. In the both surfaces of the disk substrate 20, satin-like finished shapes have not been left, but the surfaces become mirror surfaces expect for having relief shapes.

Figure 18C:
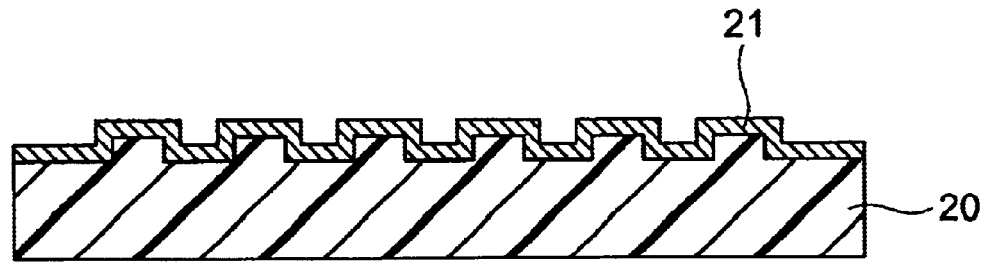

Next, as shown in FIG. 18C, films made of a magnetic material such as Pt—Co are formed on relief shapes 20a forming surface of the disk substrate by for example sputtering to thereby form the magnetic layers 21.

Next, silicone oil or another lubricant is coated to a film thickness of 10 μm or less to thereby form the lubricant layers 22.

The hard disk shown in FIG. 16 can thus be formed.

A method of producing the above hard disk shown in FIG. 17 will be explained next.

Figure 19A:
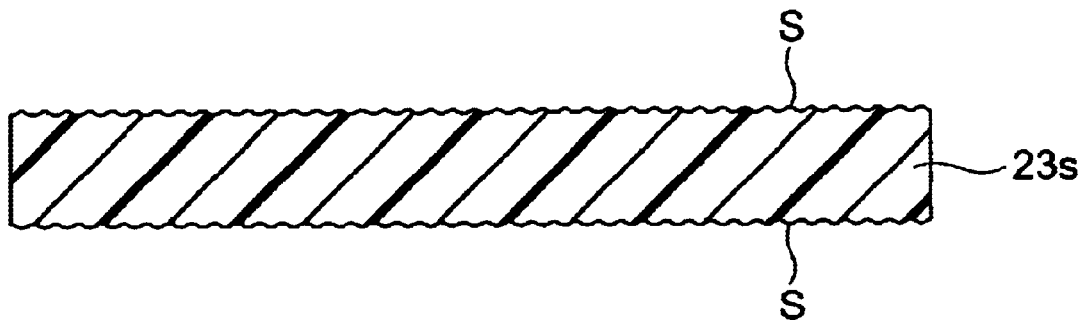
FIGS. 19A to 19C are sectional views showing a production step of a method of producing a hard disk according to the third embodiment of the present invention.
Figure 19B:
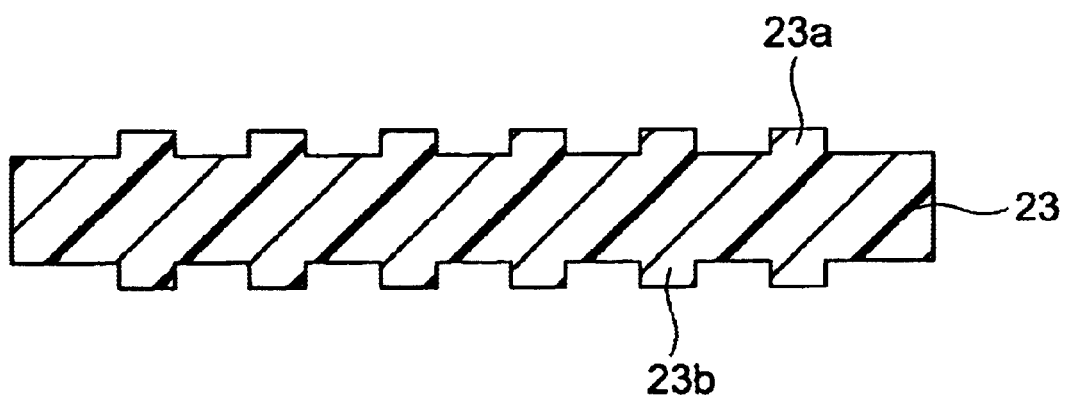

First, as shown in FIG. 19A, a surface of the disk substrate 23s formed of an amorphous polyolefin resin etc. slightly thicker than the desired thickness of 0.2 mm to 1.2 mm is processed to satin-like finished surface S. Then, as shown in FIG. 19B, the disk substrate is heated and pressed through compression molding using a stamper (not illustrated) having relief shapes so as to transfer the relief shapes to both satin-like finished surfaces of the disk substrate 23s.

As a result, a disk substrate 23 formed with relief shapes containing projecting portions (23a, 23b) in both surfaces thereof is obtained. In the both surfaces of the disk substrate 23, satin-like finished shapes have not been left, but the surfaces become mirror surfaces expect for having relief shapes.

Figure 19C:
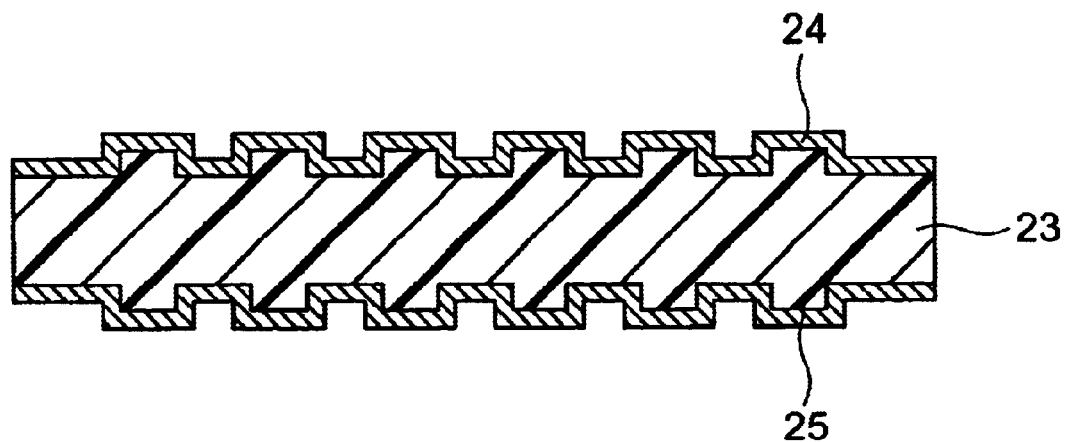

Next, as shown in FIG. 19C, films made of a magnetic material such as Pt—Co are formed on the top surface and the bottom surface of the disk substrate by for example sputtering to thereby form the first magnetic layer 24 and the second magnetic layer 25.

Next, silicone oil or another lubricant is coated to a film thickness of 10 μm or less to thereby form the lubricant layers (26, 27).

The hard disk shown in FIG. 17 can thus be formed.

In the above configuration, instead of the magnetic layers, it is also possible to form films of phase change recording materials or magneto-optical recording materials such as enumerated in the first embodiment and form over them protection films of ultraviolet curing resin etc. as coating layers so as to obtain an optical disk of the phase change system or magneto-optical recording system.

According to the above method of producing the hard disk of the present embodiment, the disk substrate formed in this way enables the production of a disk substrate having a surface of enhanced planarity free from the bulge or recesses at the outer circumferential region distinctive to a one-sided or two-sided disk obtained by injection molding and free from the fine step differences due to the mold release or stamper guides at the inner circumference unavoidable in injection molded disks and step differences at the parting surface distinctive to an assembled mold.

Further, even with a hard disk or optical disk, in the method of recording or reproducing a signal using a flight head, since the planarity of the optical disk is enhanced, the possibility of the head colliding with the bulge at the outer circumference or the step differences or burrs at the inner circumference is reduced.

In a hard disk, since a servo pattern or a clock signal is formed by pits at the time of forming the disk, a large number of complicated and expensive servo writers need not be prepared and a clean room for the same and write time of the servo signal are also not necessary, therefore the drive assembly time can be shortened.

When producing an optical disk as described above, the occurrence of an air layer caused by the bulge at the outer circumference is suppressed, even the end portion at the outer circumference can be used, and therefore improvement of the recording capacity is possible.

Below, compression molding apparatuses will be explained which can be used in above embodiments.

(Direct Heating Two-Sided Molding Apparatus)

Figure 20:
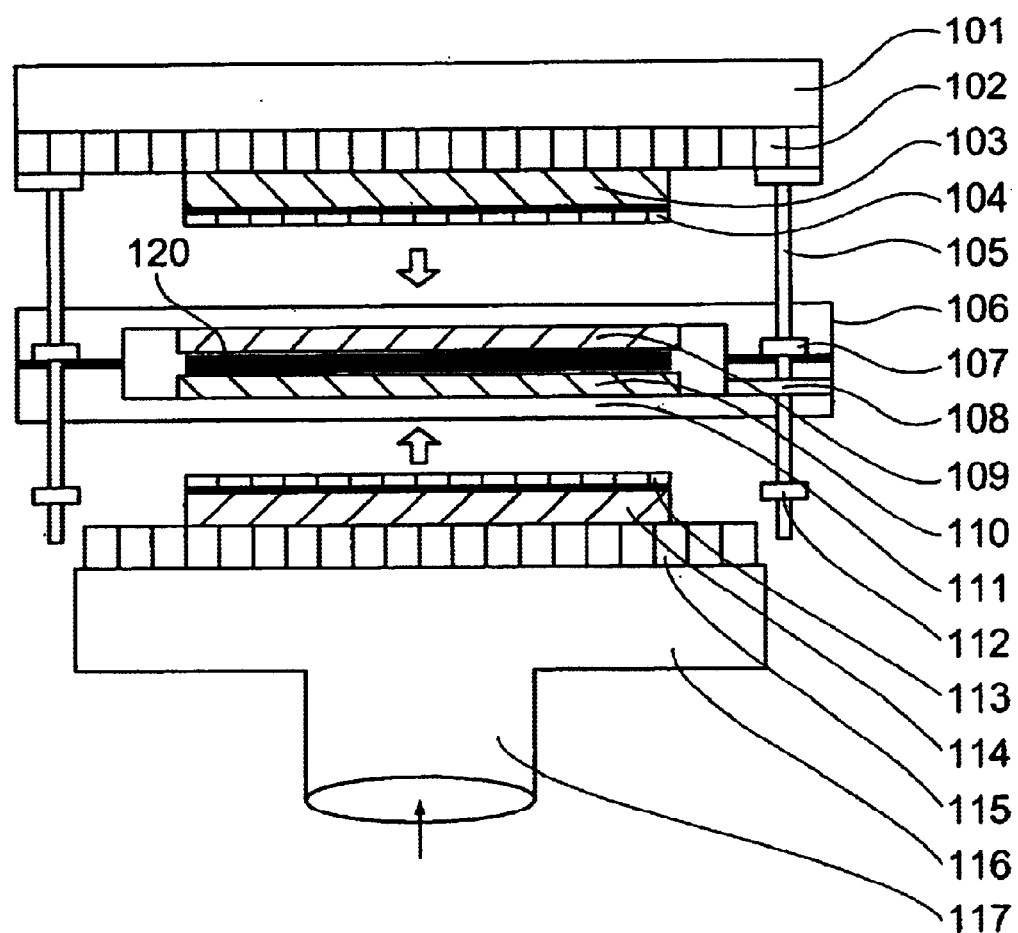
FIG. 20 is a schematic view of the configuration of a compression molding apparatus.

FIG. 20 is a schematic view of the configuration of a compression molding apparatus for pressing and hot pressing a light transmitting resin sheet (thickness of 10 $\mu$m to 100 $\mu$m) or a disk substrate (thickness of 0.2 mm to 2.0 mm) to transfer a relief pattern of the stamper thereto in the present embodiment.

A compression molding apparatus 100a has a press upper platen 101, an upper heating platen 102, an upper mold 103, a heat release sheet 104, a center mold guide 105, a first center mold 106, a stopper 107, a vacuum hole 108, a first stamper 109, a second stamper 110, a second center mold 111, a stopper 112, a heat release sheet 113, a lower mold 114, a lower heating platen 115, a press lower platen 116, and a hydraulic ram 117.

The above compression molding apparatus 100a is a three molding clamping speed, 30-ton automatic hydraulic press which has a position control mechanism.

The upper and lower molds (103, 114) are fixed to the heating platens of the press. The center mold is structured to be able to be further divided into two. The inside of the cavity can be evacuated.

A resin sheet or a disk substrate 120 is clamped by the two stampers (109, 110) in the above cavity and then pressed and heated by heaters (upper heating platen 102 and lower heating platen 115) for heating the upper and lower molds respectively to a temperature 5° C. to 50° C. higher than the glass transition temperature of the resin sheet or the disk substrate 120 to thereby transfer the relief shapes of the stampers (109, 110) to the resin sheet or the disk substrate 120.

As shown in FIG. 20, the upper heating platen 102 is attached to the press upper platen 101 of the press 100a moved up and down by the hydraulic ram 117 etc., the upper mold 103 having a flat surface is further fixed thereto, and heat release sheet 104 of thickness of 2 mm or less, that is, an elastic member having good heat conduction, is bonded to the surface of the upper mold 103.

The elastic member functions to absorb deviations in parallelism accompanying repeated up and down movement of the hydraulic ram 117 or heat expansion occurring at the time of heating the heating platen and deviations in parallelism of the upper, center, and lower molds themselves so as to enable the entire surface of the mold to be uniformly pressed.

However, an elastic member generally acts as a thermal insulator, so if it is not made as thin as possible to enable the mold to be heated through the thermal insulator, there is the drawback that the heat conduction will become poor and the formation time will become longer.

Therefore, it is desirable to use a heat release sheet of an elastic member containing boron nitride or another material superior in heat conduction (0.4 mm thick, made by Shin-Etsu Silicon Co. Ltd., product name: TC-BG Type).

(External Heating Combined Type Two-Sided Molding Apparatus)

Figure 21:
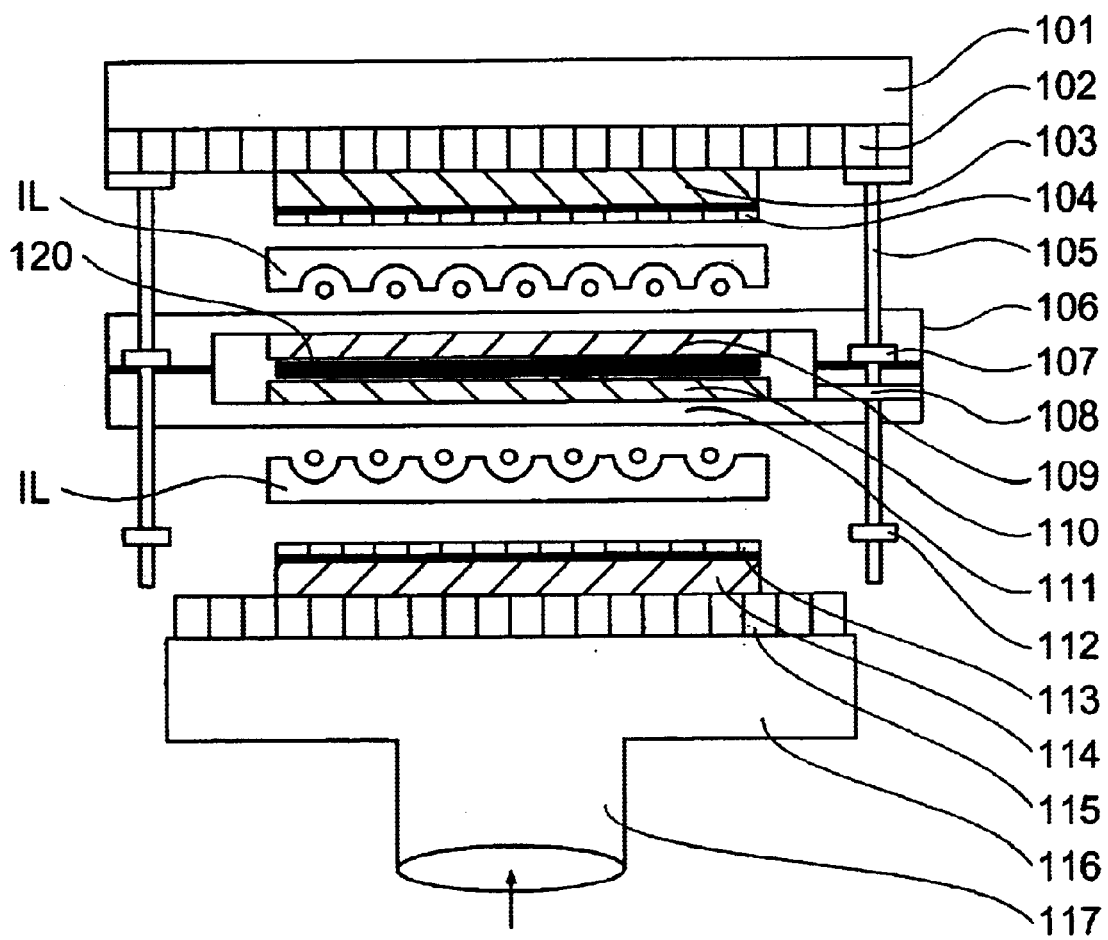
FIG. 21 is a schematic view of the configuration of the compression molding apparatus.

FIG. 21 is a schematic view of the configuration of a compression molding apparatus jointly using heating of the center mold by an external heating device in addition to the heating from the heating platens of the press in the compression molding apparatus shown in FIG. 20. As the external heating element, a near-infrared ray heater unit IL is inserted from the outside in the state where the mold assembly is opened in conjunction with the up and down movement of the molding machine. Apart from the above configuration, the rest of the configuration is substantially the same as the compression molding apparatus shown in FIG. 20.

Figure 22A:
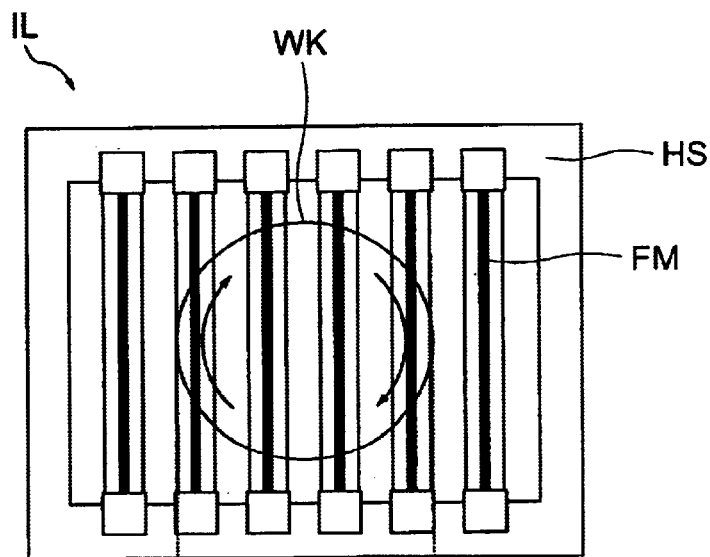
FIG. 22A is a plan view of an external heating element of the compression molding apparatus shown in FIG. 21.

When manufacturing a disk of a diameter of 120 mm, for example, as shown in FIG. 22A, the above near-infrared ray heater unit IL is comprised of a plurality of (for instance 11) for example 1 KW near-infrared ray lamps (the drawing showing the position of the filament FM) arranged at a pitch of 20 mm in a lamp housing HS and is separated from the center mold by a distance of 20 mm to make the irradiation intensity uniform.

Figure 22B:
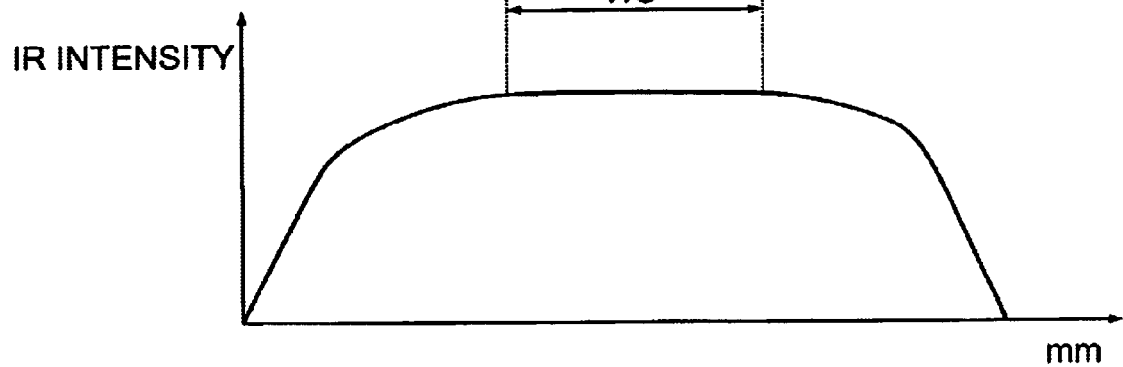
FIG. 22B is a view showing a temperature profile thereof.

The intensity of the infrared rays (IR) of the above near-infrared ray heater unit IL, as shown in FIG. 22B, is substantially uniform across the size WS of the workpiece WK, that is, the resin film or the resin sheet being processed.

The above near-infrared ray heater unit IL is inserted between the upper mold 103 and the first center mold 106 and between the second center mold 111 and the lower mold 114 in the state where the mold assembly is opened and rapidly heats the center mold (106, 111) selectively to heat the film or the sheet inside the center mold to a temperature exceeding its glass transition point, however, when the rapid heating is finished, it swiftly is retracted to the outside of the press. In conjunction with this, the hydraulic ram 117 starts to rise to heat and press the same from the upper mold 103 and lower mold 114.

For example, by irradiating near-infrared rays for 10 seconds, the surface temperature of the center mold can be raised to from 120° C. to 200° C.

Thus, by using combination of an external heating method, the heating and pressing time of for example nearly 120 seconds required in the direct heating method can be shortened to, for example, 5 seconds or less.

(Center Molds for Satin-Like Finishing Process)

In the above compression molding apparatus shown in FIG. 20 and FIG. 21, by changing the mandrel of the center mold, it is possible to obtain a compression molding process apparatus giving the surface of the resin film or resin sheet a satin-like finish and thereby capable of serving both to preform the satin-like finish and form relief shapes at the two sides.

Figure 23:
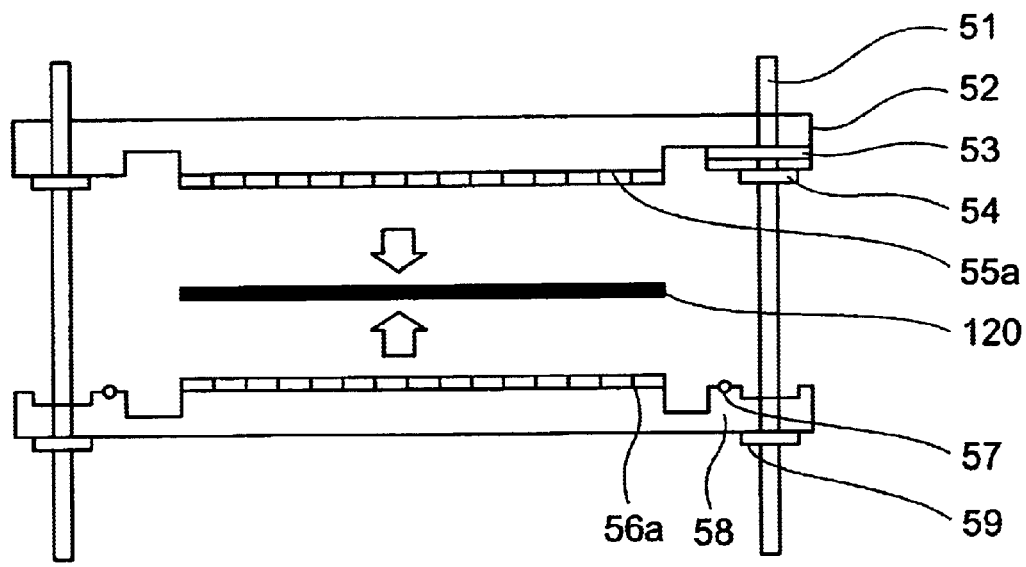
FIG. 23 is a schematic view of the configuration of a center mold of the compression molding apparatus for satin-like finished surface process.
Figure 24:
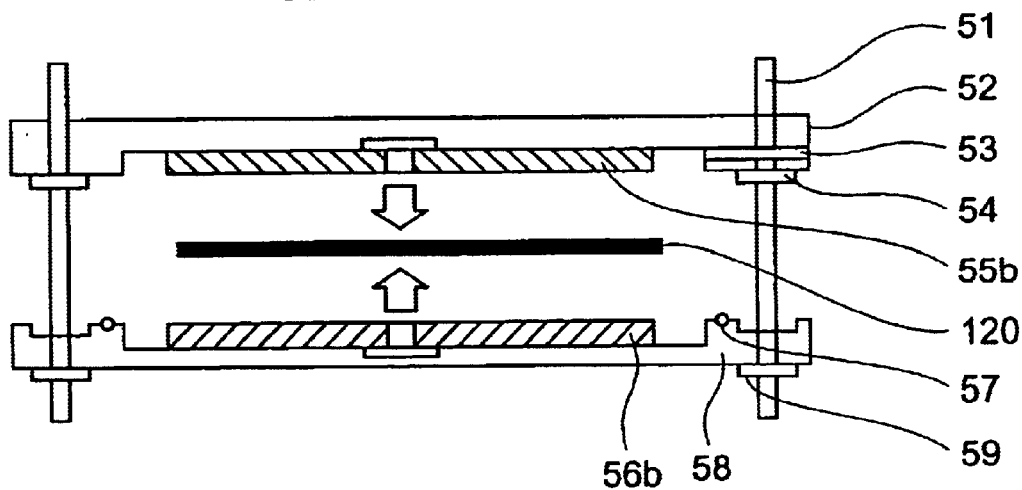
FIG. 24 is a schematic view of the configuration of a center mold of the compression molding apparatus for satin-like finished surface process.

FIG. 23 and FIG. 24 are schematic views of the center mold part for the compression molding for giving the surface of the resin film or resin sheet a satin-like finish in advance. The rest of the structure other than the center mold is substantially the same as that of the compression molding apparatus of FIG. 20.

As shown in FIG. 23, a center mold part 50a has a center mold guide 51, a first center mold 52, a vacuum hole 53, a stopper 54, glass fiberfil fluororesin sheets (55a, 56a), an O-ring 57, a second center mold 58, and a stopper 59.

The resin sheet or the disk substrate 120 is gripped between two glass fiberfil fluororesin sheets (55a, 56a) and compression molded so as to transfer the fine satin-like finish unevenness (for example, the average surface roughness Ra is 25 $\mu$m to 30 $\mu$m.) of the surfaces of the glass fiberfil fluororesin sheets (55a, 56a) and give the surfaces of the resin sheet or the disk substrate 120 a satin-like finish.

The above glass fiberfil fluororesin sheets (55a, 56a) are sheets comprised of glass fiber cloth impregnated with a fluororesin or adhesive sheets (for example, Chukoh Chemical Industries Ltd.: AFG-100).

Further, while the above adhesive sheets are used attached to the inside surfaces of the center mold, similar molding may be performed by gripping the resin sheet or disk substrate between fluororesin-impregnated glass fiber cloths (for example, 75 $\mu$m thick, product name: Fluoroglass Sheet) without use of a adhesive.

Further, as shown in FIG. 24, a center mold part 50b has a center mold guide 51, a first center mold 52, a vacuum hole 53, a stopper 54, satin-like finish plates (55b, 56b), an O-ring 57, a second center mold 58, and a stopper 59.

The resin sheet or the disk substrate 120 is gripped between the two satin-like finish plates (55b, 56b) and compression molded to transfer the fine satin-like finish unevenness of the surfaces of the satin-like finish plates (55b, 56b) and thereby give the surfaces of the resin sheet or the disk substrate 120 a satin-like finish.

For example, the above "satin-like finish plates" (55b, 56b) may be for example SUS304 1.5 mm thick plate sandblasted with SiC or alumina powder (for example, the average surface roughness Ra is 6 $\mu$m to 13 $\mu$m.) or performed with etching treatment (for example, the average surface roughness Ra is 27 $\mu$m to 37 $\mu$m.) on one surface.

Figure 25:
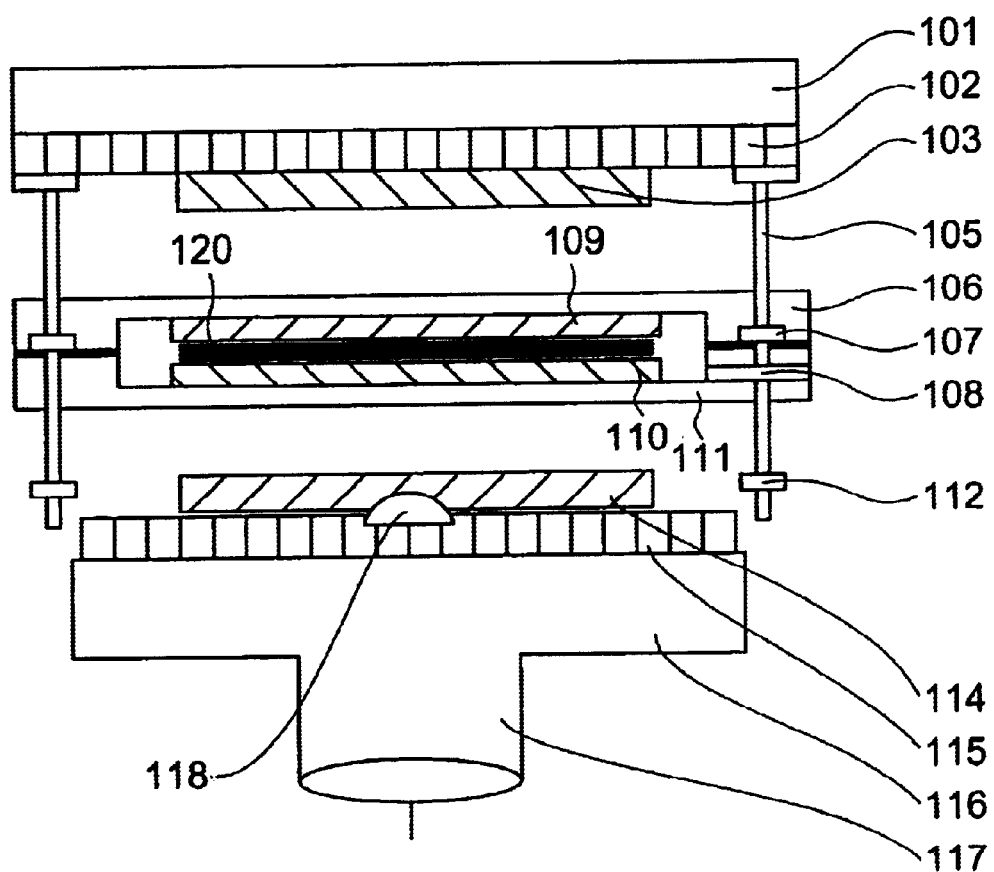
FIG. 25 is a schematic view of the configuration of the compression molding apparatus.
Figure 26A:
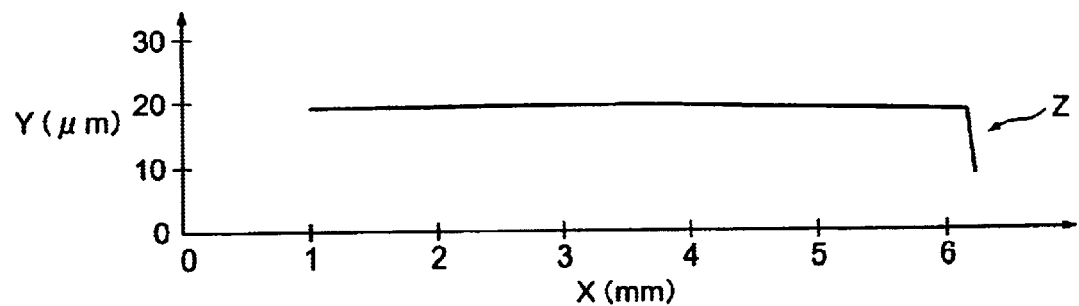
FIGS. 26A to 26D are views showing the results of measurement of the planarity of a disk substrate according to the present invention in an example.
Figure 26B:
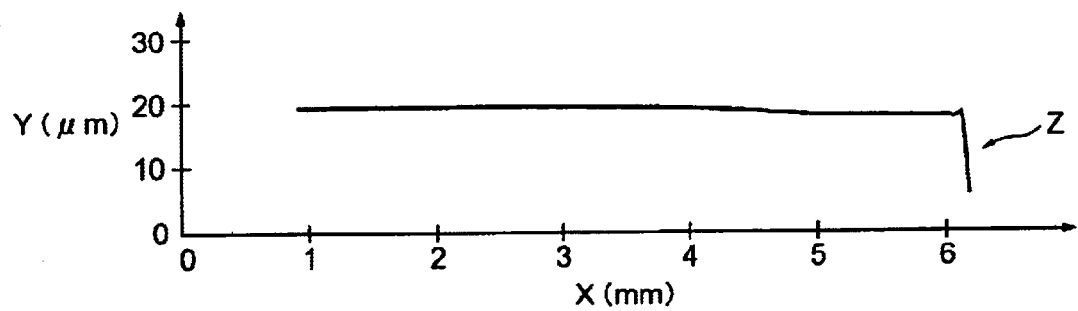
Figure 26C:
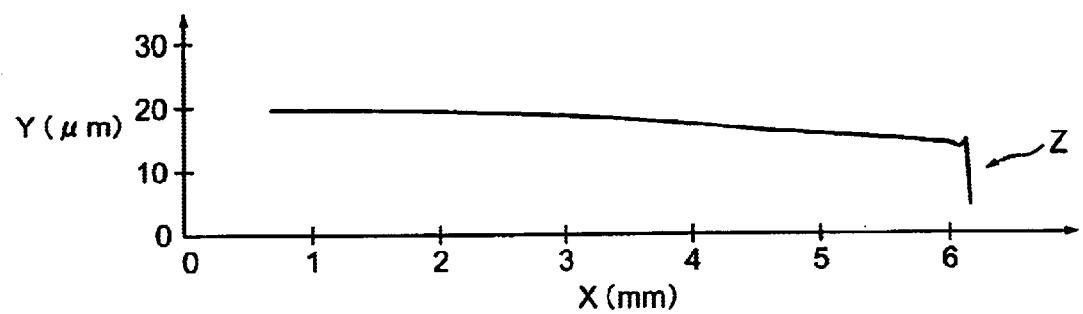
Figure 26D:
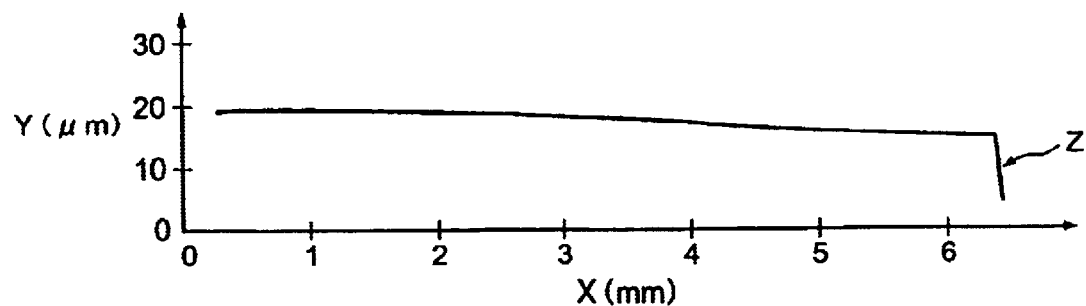

In the compression molding apparatus shown in FIGS. 20 and 21, as the method for correcting the parallelism between the press platens, it is possible to not use an elastic member, but, as shown in the schematic view of FIG. 25, to provide the lower mold with a ball joint 118 or other relief having curvature between the lower mold 114 and the lower heating platen 115, and attach the lower mold 114 to the lower heating platen 115 via the ball joint 118 to enable it to be given any parallelism and thereby enable the pressure applied to the upper, center, and lower molds at the time of pressing to be made uniform. If connected by a shaft, the result is a self-aligning bearing.

EXAMPLE

Disk substrates for optical disks were produced by the method of production according to the first embodiment and were examined for planarity.

Figure 1A:
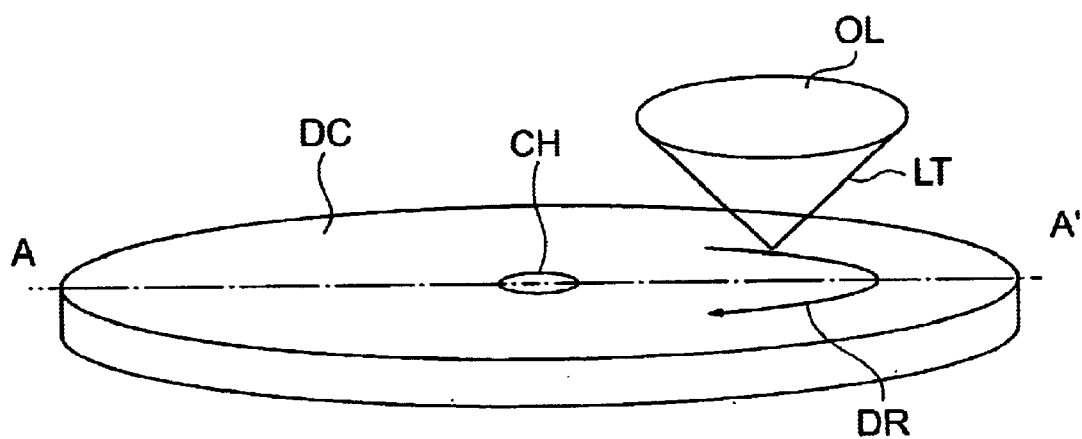
FIG. 1A is a schematic perspective view of an optical disk according to a conventional example.
Figure 1B:
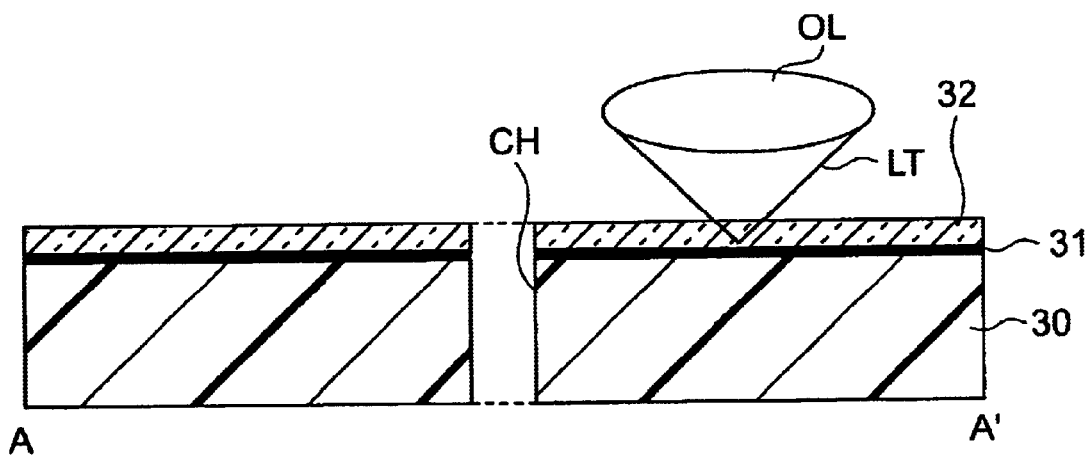
FIG. 1B is a schematic sectional view of the above optical disk.
Figure 2:
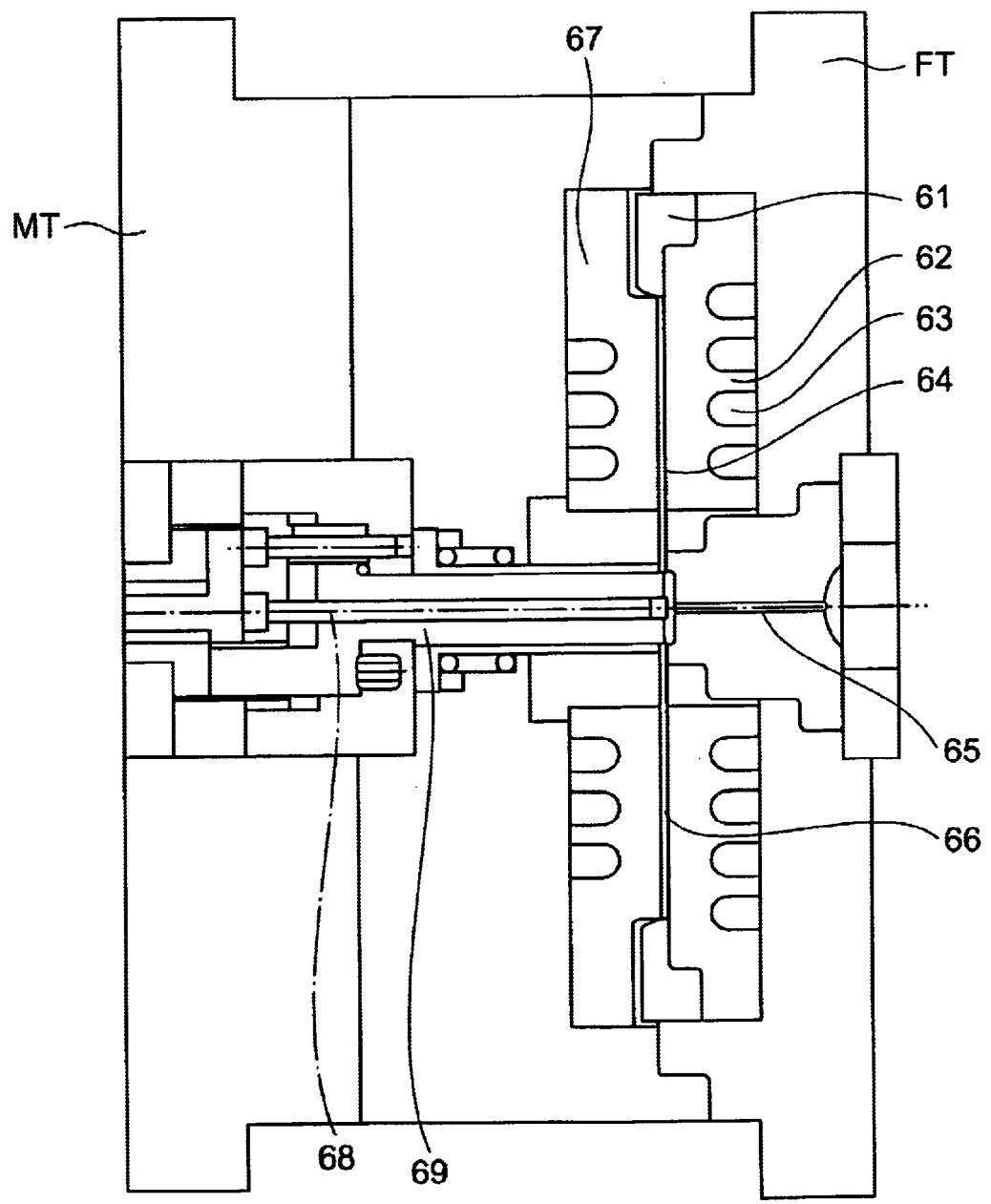
FIG. 2 is a schematic view of the configuration of an injection molding apparatus for forming a disk substrate according to a conventional method.
Figure 3A:
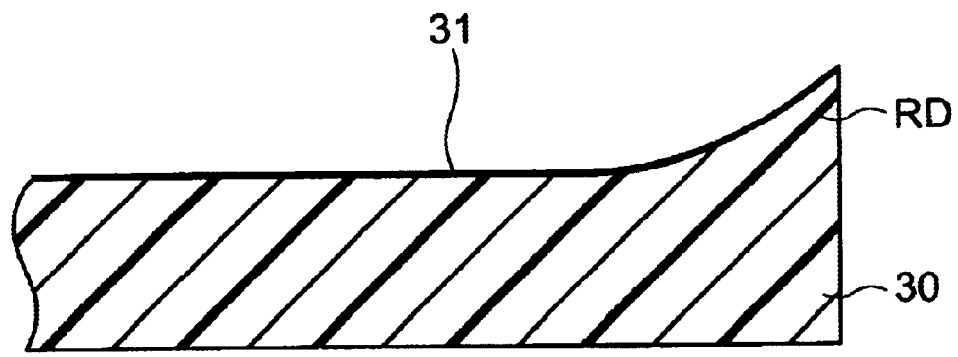
FIGS. 3A and 3B are views for explaining the problem of the conventional example.
Figure 3B:
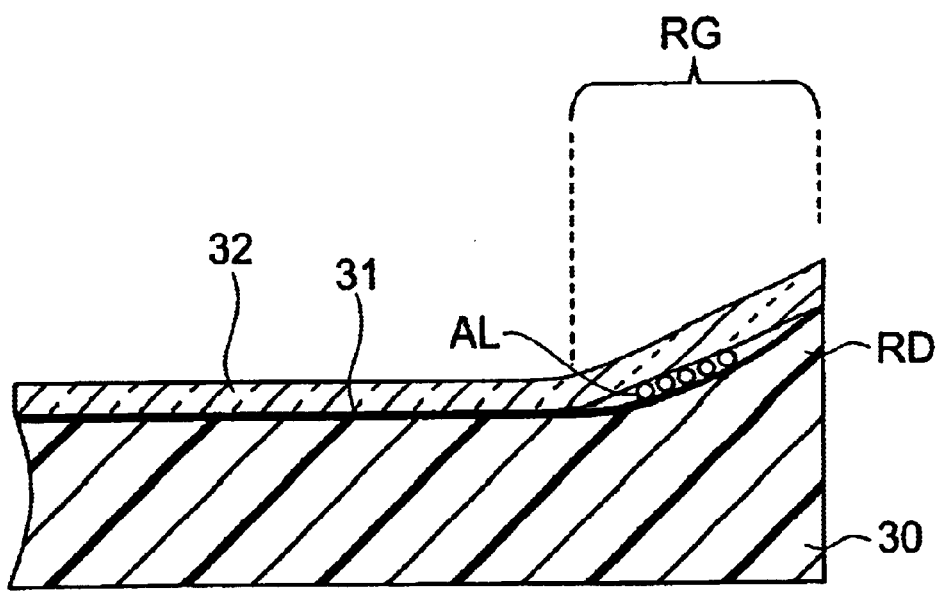
Figure 4A:
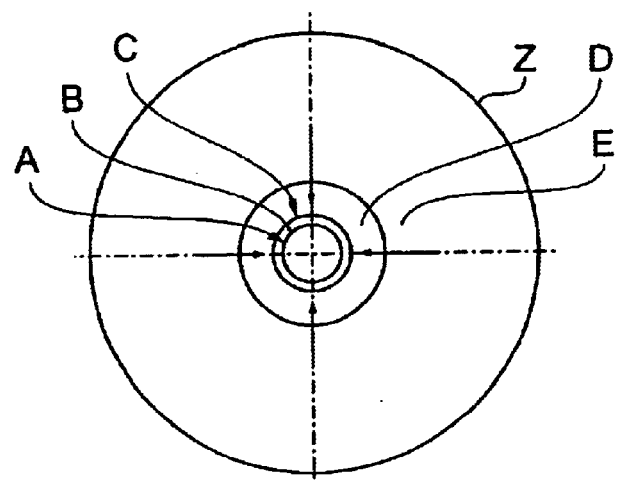
FIG. 4A is a plan view of a signal surface.
Figure 4B:
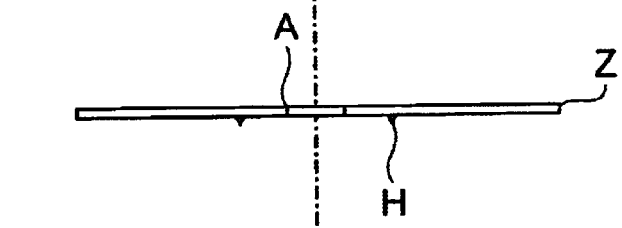
FIG. 4B is a side view thereof.
Figure 4C:
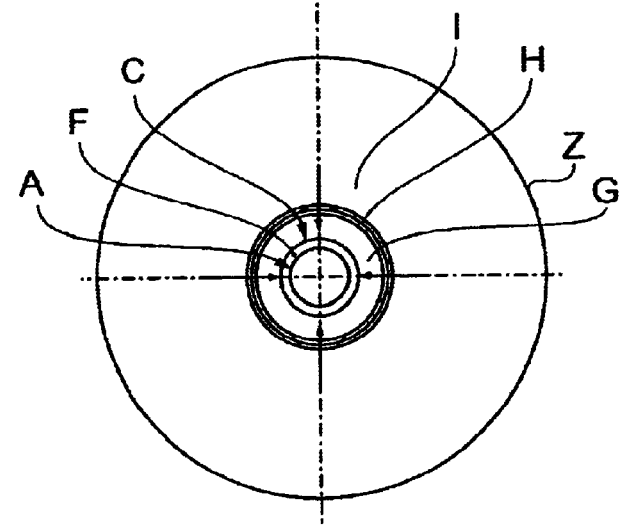
FIG. 4C is a plan view of a read surface of the disk substrate.
Figure 5A:
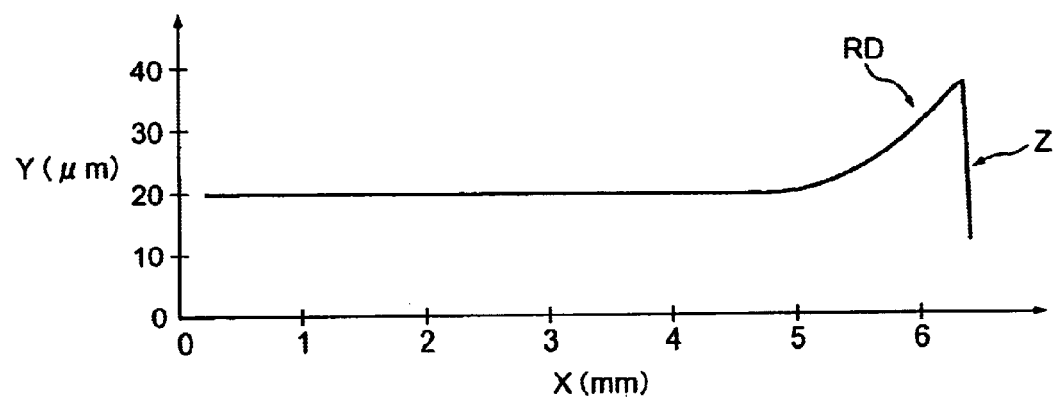
FIGS. 5A and 5B are views showing the results of measurement of the planarity of a disk substrate obtained according to the conventional method.
Figure 5B:
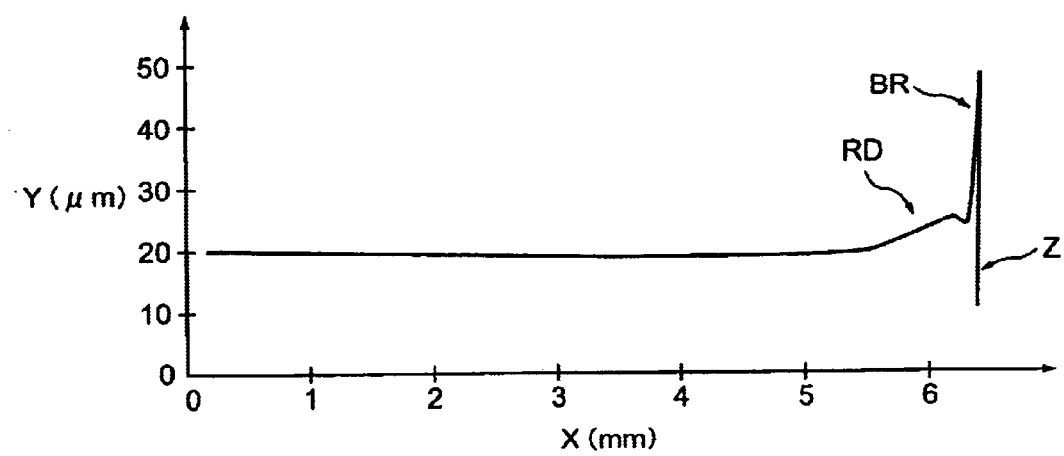
Figure 6A:
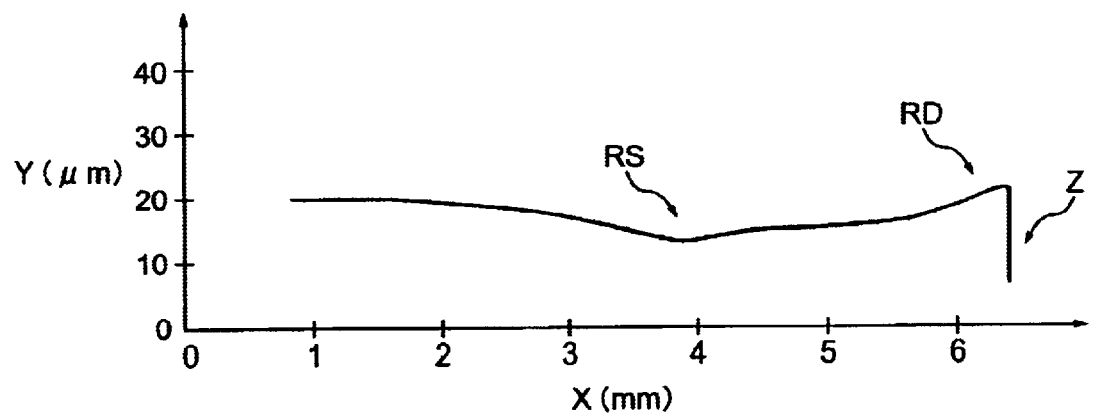
FIGS. 6A and 6B are views showing the results of measurement of the planarity of a disk substrate according to the conventional method.
Figure 6B:
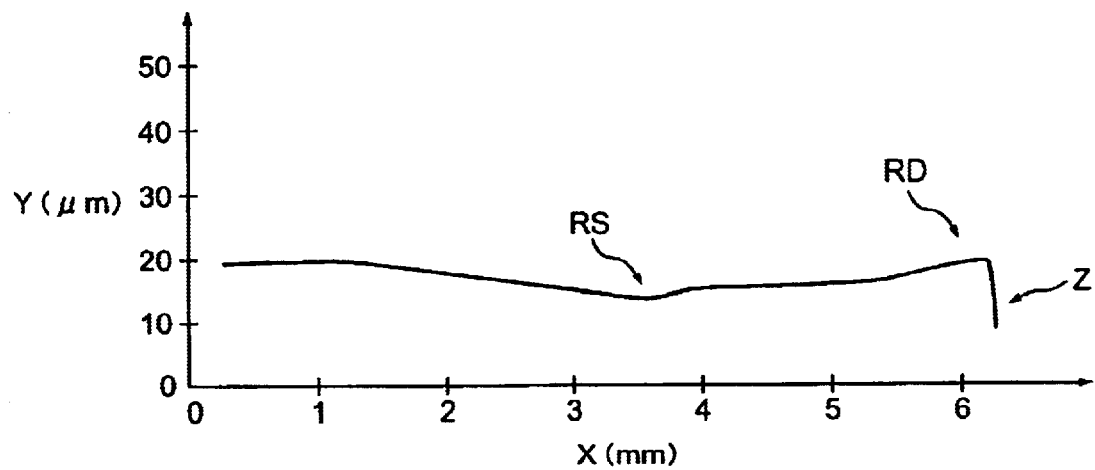
Figure 7A:
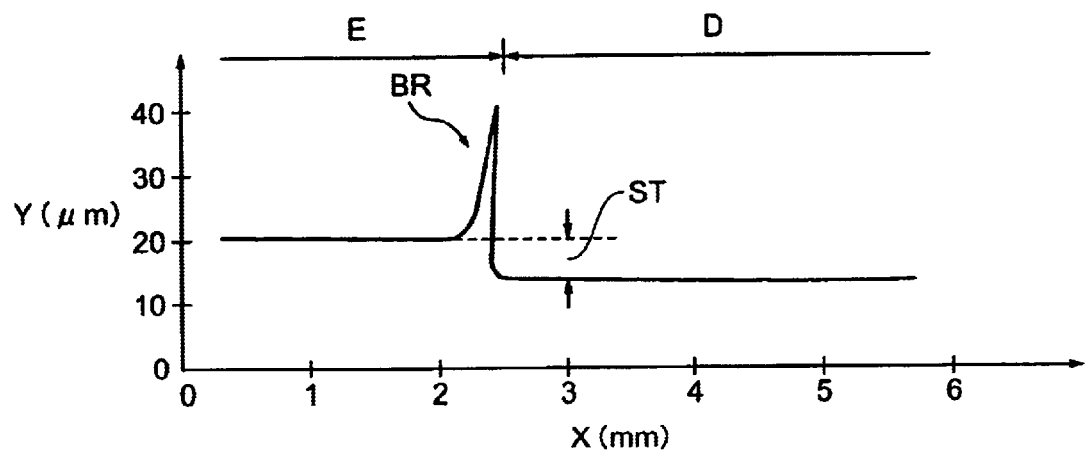
FIGS. 7A and 7B are views showing the results of measurement of the planarity of a disk substrate according to the conventional method.
Figure 7B:
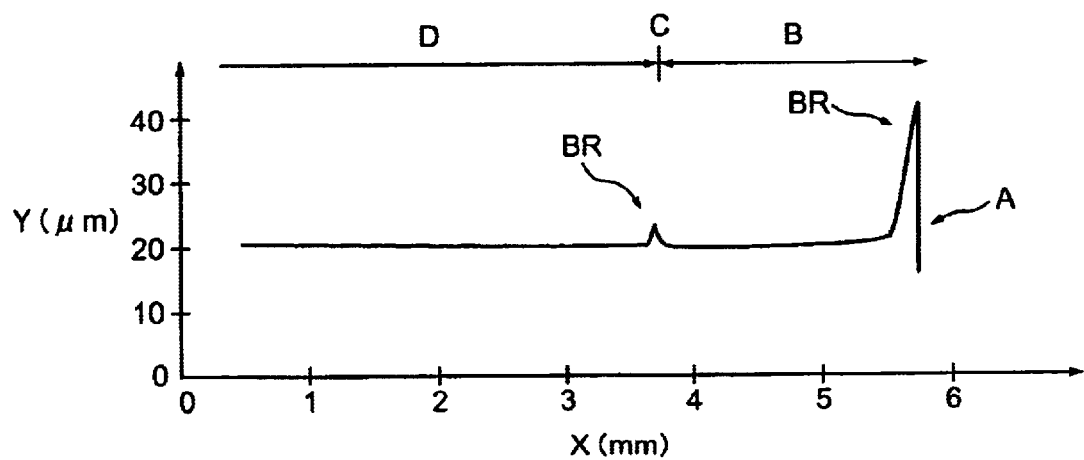
Figure 8A:
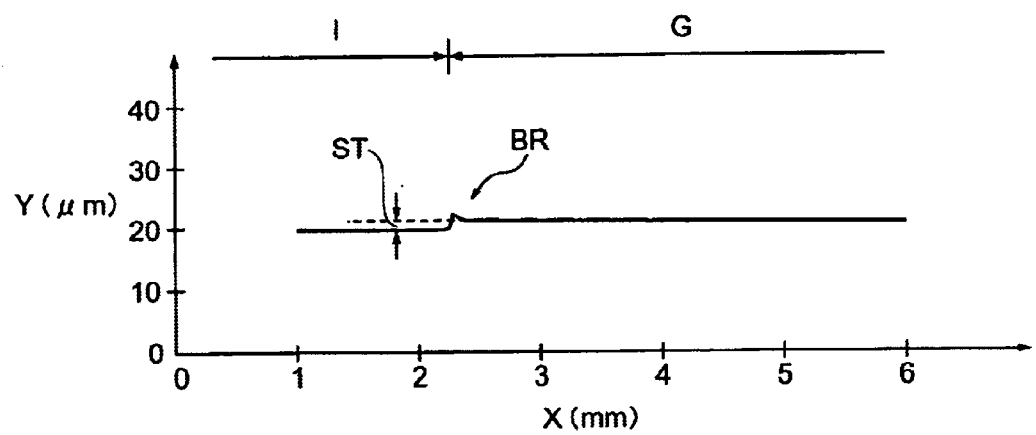
FIGS. 8A and 8B are views showing the results of measurement of the planarity of a disk substrate according to the conventional method.
Figure 8B:
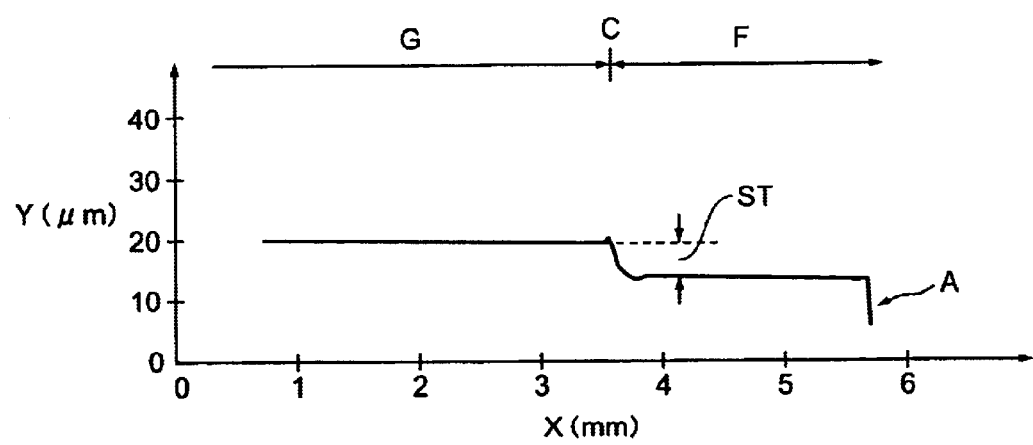

Here, the disk substrates being produced have the shapes shown in FIGS. 4A to 4C.

FIGS. 26A to 26D are views showing the measurement results of the planarity in the vicinity of an outer circumferential end of the disk substrate produced by the production method according to the first embodiment. The abscissa denotes a position on the disk X(mm), while the ordinate denotes a height of the surface Y($\mu$m). In the figure, FIGS. 26A, 26B, 26C, and 26D correspond to the measurement results at positions rotated 0 degree, 90 degrees, 180 degrees, and 270 degrees clockwise around the center of the disk from a reference radius position when setting a radius position serving as a reference of the disk. Note that the results are almost the same as those of the signal surface and the read surface.

In the vicinity of the outer circumferential end Z, there is no longer any bulge of the disk and there are no burrs seen.

Further, in the disk substrate produced by the production method according to the first embodiment, both of the occurrence of burrs and step differences such as above in the vicinity of the innermost diameter A was suppressed.

According to the present embodiment, by gripping a resin sheet or a disk substrate processed to a satin-like finish between two stampers and heating and pressing the same, it is possible to easily obtain a resin sheet or a disk substrate having information signal at the two sides without regard to thickness as compared with conventional formation where mold parts had to be designed, fabricated, and exchanged in order to change the thickness.

An optical disk of single layer, or an optical disk of multiplayer of a two- to three-layers structure can be formed without the time and expense to fabricate mold parts or the work of exchanging the same.

As the disk substrate, for example, any one-sided or two-sided substrate having a thickness of 0.2 mm to 2.0 mm can be formed, the orientation strain at the time of injection and cooling which cannot be achieved in injection molding is extremely small, and a flat disk having no recesses or bulge at the outer circumference or burrs or step differences at the inner and outer circumference can be achieved. Application to hard disk media other than optical disks is also possible.

Further, in optical disks, disks having an extremely small birefringence at both the inner and outer circumferences can also be achieved.

Further, the resin sheet can be cut into any size, it is easy to handle large to small sized disks without preparing different molds each time. Disks of different thicknesses, which could not be obtained up until now without changing the mold parts, become possible just by changing the thickness of the resin sheet used. The time spent on the design and fabrication of the mold parts is shortened and the mold parts need not be manufactured, so the speed of development and manufacture can be increased and costs cut.

In the hard disk, since a servo pattern or a clock signal is formed by pits at the time of forming the disk, a large number of complicated and expensive servo writers need not be provided, so a clean room and the write time of a servo signal are also not necessary and therefore the drive assembly time can be shortened.

The present invention is not limited to the above embodiments.

For example, the optical recording layer is not limited to the layer configuration, the materials, thicknesses, etc. of the magnetic layer or the protection layer or other coating layers described in the above embodiments. These can be suitably selected.

Further, the materials etc. of the disk substrate are not limited to the above materials. Any material that can be processed into a disk shape by the compression molding process can be used.

Numerous other modifications can also be made to an extent not changing the gist of the present invention.

According to the method of producing an information recording medium of the present invention, in the process of producing the optical disk or other information recording medium, it is possible to produce a disk substrate or a resin sheet having enhanced planarity with high productivity.

According to the production apparatus for an information recording medium of the present invention, as the production apparatus for optical disk or other information recording medium, it is possible to produce a disk substrate or a resin sheet having enhanced planarity with high productivity.

According to the information recording medium of the present invention, as the optical disk or other information recording medium, there is provided an information recording medium wherein a disk substrate or a resin sheet can be produced which has enhanced planarity with high productivity.

What is claimed is:

1. A method of producing an information recording medium comprising steps of:
   processing a surface of a disk substrate by satin-like finishing,
   heating and pressing said disk substrate through compression using a stamper having relief shapes so as to transfer said relief shapes to at least one satin-like finished surface of said disk substrate,
   forming a recording layer on said relief shape surface of said disk substrate, and
   forming a coating layer on said recording layer.

2. A method of producing an information recording medium as set forth in claim 1, said information recording medium being formed where light is focused from said coating layer side to said recording layer to record or reproduce information, further comprising:
   forming an optical recording layer as said recording layer, and
   forming a light transmitting coating layer as said coating layer.

3. A method of producing an information recording medium as set forth in claim 1, wherein
   a magnetic recording layer is formed as said recording layer, and
   a lubricant layer is formed as said coating layer.

4. A method of producing an information recording medium as set forth in claim 1, further comprising:
   transferring said relief shapes to both sides of said disk substrate,
   forming recording layers on said relief shape surfaces of both sides of said disk substrate, and
   forming coating layers on said recording layers of both sides of said disk substrate.

5. A method of producing an information recording medium as set forth in claim 1, further comprising heating said disk substrate by electromagnetic induction heating in said compression molding.

6. A method of producing an information recording medium as set forth in claim 1, further comprising using a halogen lamp having a plurality of near-infrared ray lamps or far-infrared ray lamps arranged therein to heat said disk substrate in said compression molding.

7. A method of producing an information recording medium as set forth in claim 1, further comprising heating said disk substrate to a temperature 5° C. to 50° C. higher than a glass transition temperature thereof in said compression molding.

8. A method of producing an information recording medium comprising steps of:
   processing a surface of a disk substrate by satin-like finishing,
   heating and pressing said disk substrate through compression using a stamper having relief shapes so as to transfer said relief shapes to at least one satin-like finished surface of said disk substrate,
   forming a first optical recording layer on said relief shape surface of said disk substrate,
   processing a surface of a resin sheet by satin-like finishing,
   heating and pressing said resin sheet through compression using a stamper having relief shapes so as to transfer said relief shapes to at least one satin-like finished surface of said resin sheet,
   forming a second optical recording layer on said relief shape surface of said resin sheet,
   bonding said first optical recording layer and said second optical recording layer.

9. A method of producing an information recording medium as set forth in claim 8, further comprising steps of:
   further forming relief shapes on the other surface of said resin sheet in the step of transferring said relief shapes to one surface of said resin sheet
   forming a third optical recording layer on the relief shape surface of the other surface of said resin sheet, and
   forming a light transmitting coating layer on the third optical recording layer.

10. A method of producing an information recording medium as set forth in claim 8, further comprising heating said resin sheet by electromagnetic induction heating in said compression molding.

11. A method of producing an information recording medium as set forth in claim 8, further comprising using a halogen lamp having a plurality of near-infrared ray lamps or far-infrared ray lamps arranged therein to heat said resin sheet in said compression molding.

12. A method of producing an information recording medium as set forth in claim 8, further comprising heating said resin sheet to a temperature 5° C. to 50° C. higher than a glass transition temperature thereof in said compression molding.

13. A production apparatus for forming a substrate having relief shapes on at least one surface thereof of an information recording medium comprising said substrate and a recording layer formed on said relief shape surface of said substrate,
   said production apparatus of an information recording medium comprising:
   a mold for a compression molding having on an inside surface of a cavity thereof a stamper having relief shapes corresponding to said relief shapes,
   a heating means for heating said mold, and
   a pressing means for pressing said mold,
   said mold being split into an upper, center, and lower parts and being attached to a press movable vertically by said pressing means,
   a means for correcting parallelism of said lower mold and said upper mold of said press at the time of pressing of said press and making a pressing force uniform between said lower mold and upper mold being provided.

14. A production apparatus of an information recording medium as set forth in claim 13, wherein said means for making a pressing force uniform between said lower mold and upper mold comprises a bearing having a predetermined curvature provided at an attaching plate of said lower heating platen or said lower mold.

15. A production apparatus of an information recording medium as set forth in claim 13, wherein said means for making a pressing force uniform between said lower mold and upper mold comprises elastic member sheets having a thickness of 0.2 mm to 2.0 mm bonded to flat surfaces of the surfaces of said upper and lower molds in contact with the center mold.

16. An information recording medium comprising:
   a disk substrate having relief shapes on at least one surface thereof,
   a recording layer formed on the relief shape surface of the disk substrate, and
   a coating layer formed on the recording layer,
   said disk substrate being a disk substrate processed by a satin-like finishing of the surface thereof, then transferred with said relief shapes to the satin-like finished surface thereof by heating and pressing through compression molding using a stamper having relief shapes.

17. An information recording medium comprising a disk substrate having relief shapes on at least one surface thereof, a first optical recording layer formed on the relief shape surface of said disk substrate, a resin sheet having relief shapes on at least one surface thereof, a second optical recording layer formed on the relief shape surface of said disk substrate, said first optical recording layer and said second optical recording layer being bonded, and light being focused from said resin sheet side for the disk substrate to said first optical recording layer and said second optical recording layer to record or reproduce information, wherein
   said disk substrate being a disk substrate processed by a satin-like finishing of the surface thereof, then transferred with said relief shapes to the satin-like finished surface thereof by heating and pressing through compression molding using a stamper having relief shapes,
   said resin sheet being a resin sheet processed by a satin-like finishing of the surface thereof, then transferred with said relief shapes to the satin-like finished surface thereof by heating and pressing through compression molding using a stamper having relief shapes.

18. An information recording medium as set forth in claim 17, wherein relief shapes are further formed on the other surface of said resin sheet, an third optical recording layer is further formed on the relief shape surface of the other surface of the film substrate, and a light transmitting coating layer is formed at the upper layer of the third optical recording layer.

* * * * *